(12) United States Patent
Fukuda et al.

(10) Patent No.: US 9,183,263 B2
(45) Date of Patent: Nov. 10, 2015

(54) INFORMATION PROVIDING SYSTEM, INFORMATION PROVIDING METHOD, AND PROGRAM

(75) Inventors: Kazuhiro Fukuda, Kanagawa (JP); Tetsuo Maruyama, Tokyo (JP); Akihiko Ito, Kanagawa (JP)

(73) Assignee: Sony Corporation (JP)

(*) Notice: Subject to any disclaimer, the term of this patent is extended or adjusted under 35 U.S.C. 154(b) by 875 days.

(21) Appl. No.: 13/369,685

(22) Filed: Feb. 9, 2012

(65) Prior Publication Data

US 2012/0215794 A1 Aug. 23, 2012

(30) Foreign Application Priority Data

Feb. 18, 2011 (JP) ................................ P2011-033542

(51) Int. Cl.
*G06F 17/30* (2006.01)

(52) U.S. Cl.
CPC .... *G06F 17/30557* (2013.01); *G06F 17/30997* (2013.01)

(58) Field of Classification Search
CPC ................... G06F 17/30557; G06F 17/30997; G06F 17/40
USPC .......... 707/707, 748, 749, 751, 753, 754, 758
See application file for complete search history.

(56) References Cited

U.S. PATENT DOCUMENTS 7,827,186 B2 * 11/2010 Hicks ............................ 707/749
8,260,771 B1 * 9/2012 Ortega et al. ................. 707/723
2003/0182296 A1 * 9/2003 Sato et al. ..................... 707/100
2004/0267518 A1 * 12/2004 Kashima et al. ................. 704/9
2005/0022236 A1 * 1/2005 Ito et al. ......................... 725/39

(Continued)

FOREIGN PATENT DOCUMENTS

JP 2007511154 A 4/2007
JP 2009-065363 A 3/2009

(Continued)

OTHER PUBLICATIONS

Office Action from Japanese Application No. 2011-033542, dated Aug. 26, 2014.
Takayuki Akiyama, Proposal and Evaluation of Serendipitous Recommendation by Introducing Metric Independent of User Profiles, 9th Forum on Information Science and Technology (FIT2010), Japan, Institute of Electronics, Information and Communication Engineers, Aug. 20, 2010, p. 157-164.

(Continued)

*Primary Examiner* — James Trujillo
*Assistant Examiner* — Fatima Mina
(74) *Attorney, Agent, or Firm* — Lerner, David, Littenberg, Krumholz & Mentlik, LLP

(57) ABSTRACT

Provided are providing an ECG unit which is formed of content information and related information related thereto, and is linked to another ECG unit through the related information, calculating an association-degree score between the pieces of content information based on a degree of association of an attribute between the pieces of content information, collecting a history of operation performed for making a transition from a link-source-ECG unit to a link-destination-ECG unit, as a usage log of the ECG unit, calculating a transition score between the ECG units in a manner that a weight of a larger correction coefficient is assigned to a number of usage logs, as there are more attributes of content information having low degree of association with each other between the link-source-ECG unit and the link-destination-ECG unit, and generating an ECG unit linked to another ECG unit, based on the association-degree score and the transition score.

4 Claims, 21 Drawing Sheets

(56) References Cited

U.S. PATENT DOCUMENTS

| | | |
|---|---|---|
| 2006/0248068 A1* | 11/2006 | Chien et al. .................. 707/4 |
| 2007/0073431 A1* | 3/2007 | Roumeliotis et al. ......... 700/100 |
| 2007/0288965 A1 | 12/2007 | Murakami et al. |
| 2009/0063569 A1 | 3/2009 | Fukuda et al. |
| 2010/0146102 A1* | 6/2010 | Bi et al. .................. 709/224 |

FOREIGN PATENT DOCUMENTS

| | | |
|---|---|---|
| JP | 2010035018 A | 2/2010 |
| JP | 2010225115 A | 10/2010 |

* cited by examiner

FIG.5

```
<?xml version="1.0" encoding="UTF-8"?>
<ecg_unit id="00000100" viewType="APC1.0" default="0" networkID="7fe2" serviceID="0410" startTime="2010-12-
04T22:00:00+09:00">
    <content>
        <title><![CDATA[Winter Sakura]]></title>
        <description><![CDATA[Winter Sakura]]></description>
        <descriptionLong><![CDATA[Costarring Actor and B, popular piece in 2010]]>
        </descriptionLong>
        <sponsor><![CDATA[xyzcompany]]></sponsor>
        <representativeImageURL>http://testData/forTV/4_seigi/data/seigi_logo_S.png</representativeImageURL>
        <image1URL>http://testData/forTV/4_seigi/data/seigi_logo_L.png</image1URL>
        <image2URL>http://testData/forTV/4_seigi/data/nittele_logo.png</image2URL>
        <image3URL></image3URL>
        <linkURL></linkURL>
    </content>
    <ecg_link id="001" type="program" layoutType="000" data="direct" index="0" status="0" message="OK">
        <ecg_unit_ref="00033100"
        <title><![CDATA[Super Doctor]]></title>
        <description><![CDATA[Starring Actor A, top-rated TV program in 2009]]></description>
        </descriptionLong>
        <image1URL>http://testData/forTV/4_seigi/data/seigi_logo_L.png</image1URL>
        ...
    </ecg_link>
    <ecg_link id="002" type="person" layoutType="010" data="direct" index="1" status="0" message="OK">
        ...
    </ecg_link>
    <ecg_link id="003" type="ad" layoutType="020" data="direct" index="2" status="0" message="OK">
        ...
    </ecg_link>
    <ecg_link id="004" type="ec" layoutType="030" data="mashupECMetaSearch" index="3" status="0" message="OK">
        ...
    </ecg_link>
</ecg_unit>
```

Annotations (right side brackets):
- DEFINITION METADATA FOR ECG UNIT
- METADATA FOR CONTENT INFORMATION
- METADATA FOR RELATED INFORMATION 1
- METADATA FOR RELATED INFORMATION 2
- METADATA FOR RELATED INFORMATION 3
- METADATA FOR RELATED INFORMATION 4

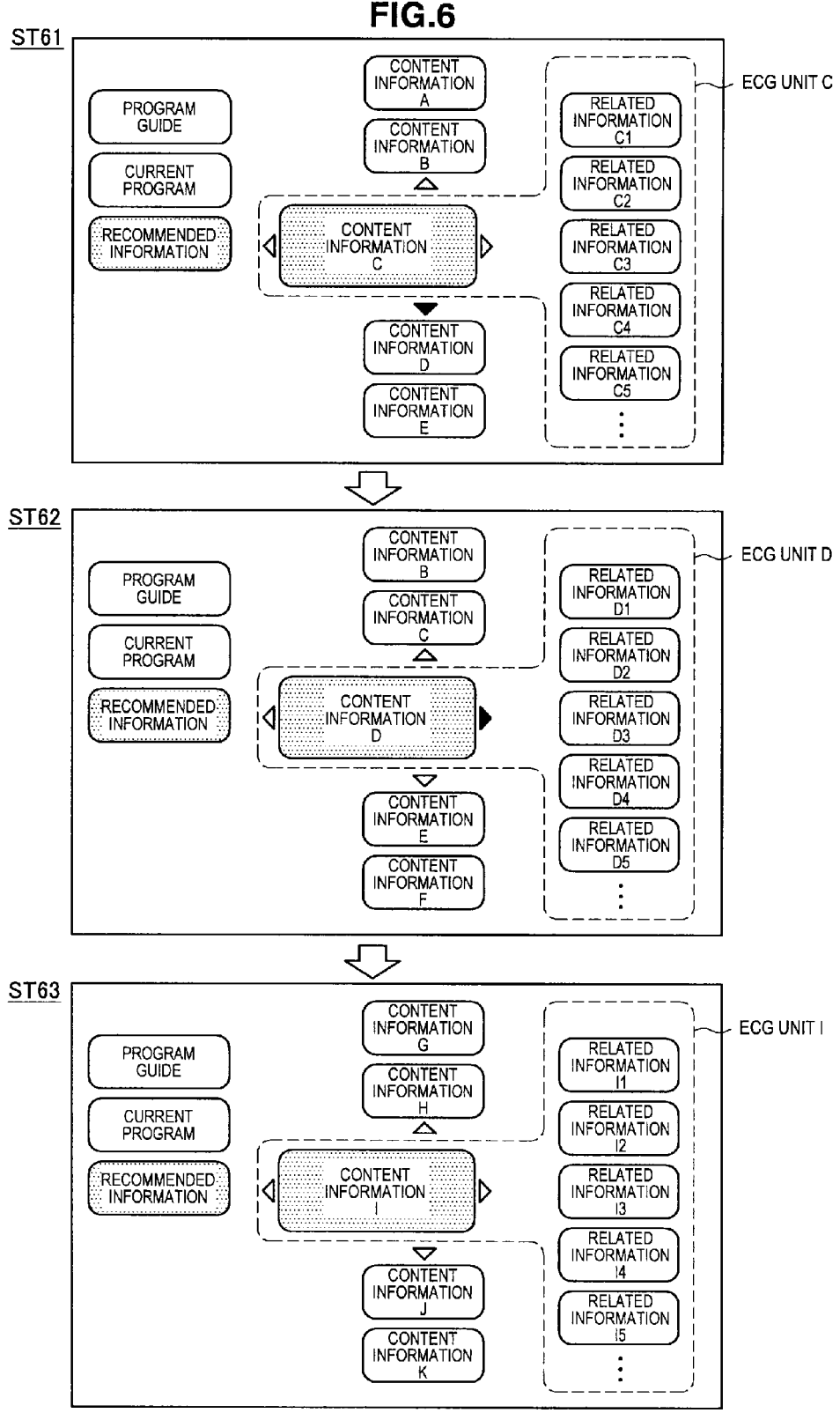

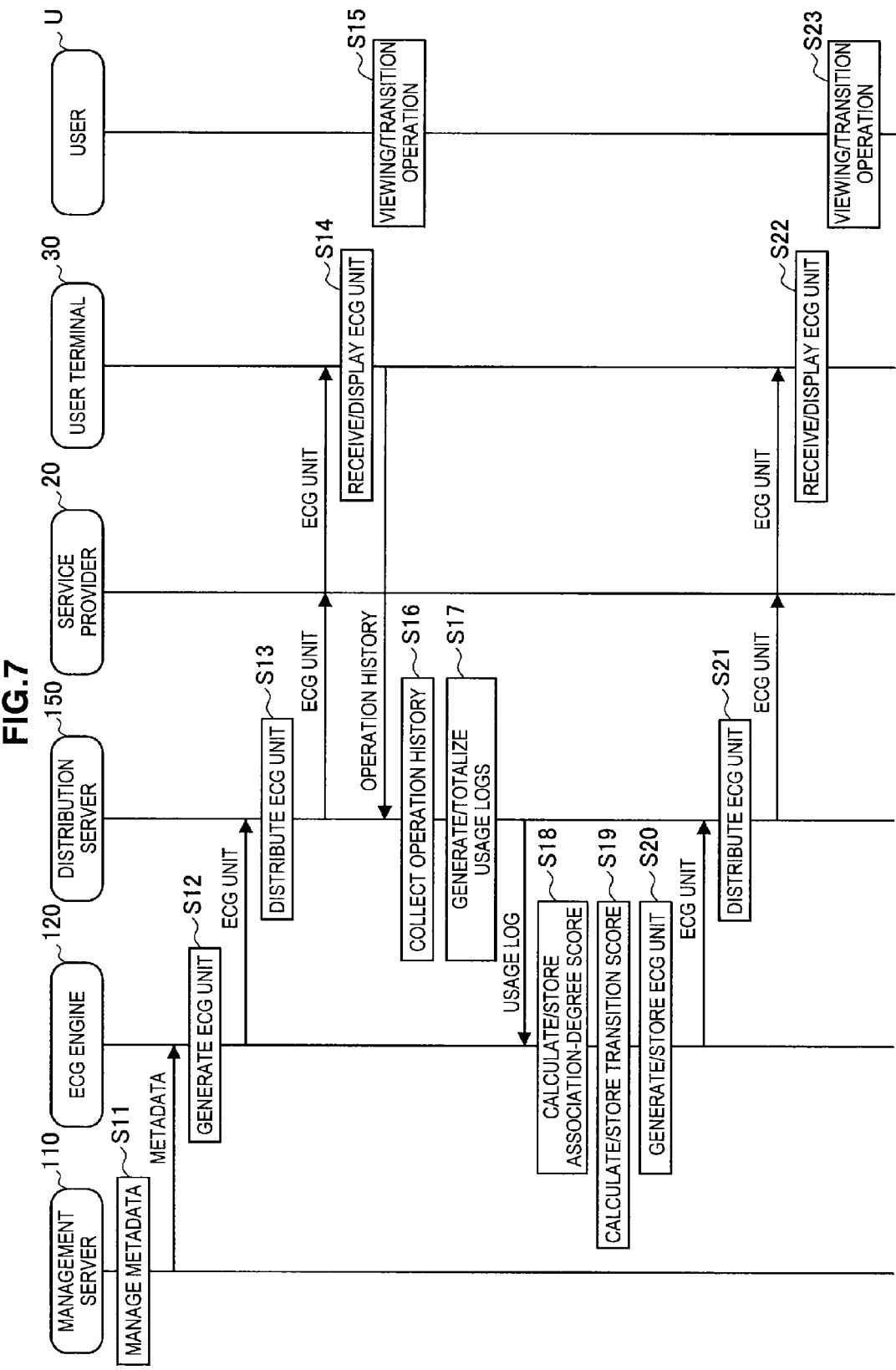

FIG.9
ST91
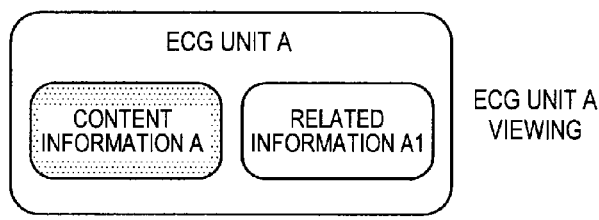
ECG UNIT A VIEWING
ST92
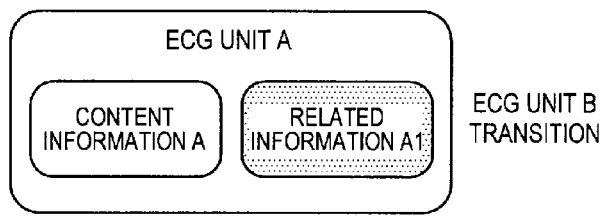
ECG UNIT B TRANSITION
ST93
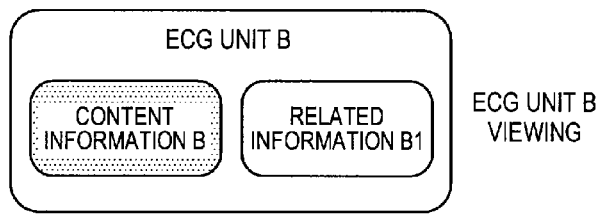
ECG UNIT B VIEWING
ST94
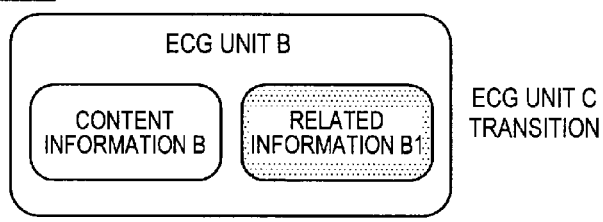
ECG UNIT C TRANSITION
ST95
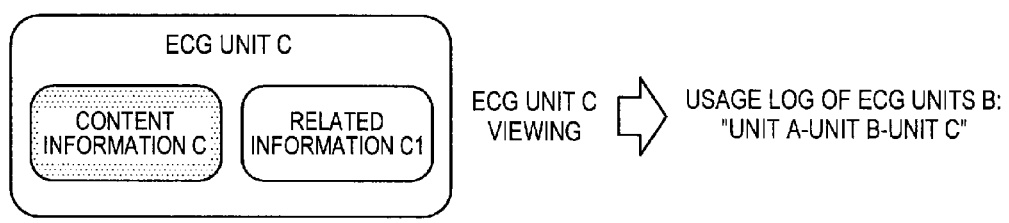
ECG UNIT C VIEWING ⇨ USAGE LOG OF ECG UNITS B: "UNIT A-UNIT B-UNIT C"

FIG.11

| ITEM | CORRECTION INDEX | CORRECTION COEFFICIENT |
|---|---|---|
| COMMON | GENRE<br>SUB-GENRE<br>PLACE<br>TARGET AGE GROUP | 0.5<br>0.1<br>0.3<br>0.2 |
| PROGRAM | BROADCAST DATE/TIME<br>CHANNEL<br>BROADCAST STATION<br>SPONSOR<br>BROADCAST PERIOD | 0.1<br>0.2<br>0.3<br>0.2<br>0.1 |
| PRODUCT | HANDLING SITE<br>CATEGORY<br>PRICE RANGE | 0.2<br>0.3<br>0.2 |
| ADVERTISEMENT | SPONSOR | 0.2 |

FIG.12

SERVICE FORM A

| ITEM | CORRECTION INDEX | CORRECTION COEFFICIENT |
|---|---|---|
| COMMON | GENRE | 0.5 |

SERVICE FORM B

| ITEM | CORRECTION INDEX | CORRECTION COEFFICIENT |
|---|---|---|
| COMMON | GENRE<br>TARGET AGE GROUP | 0.5<br>0.2 |
| PROGRAM | BROADCAST PERIOD | 0.1 |

SERVICE FORM C

| ITEM | CORRECTION INDEX | CORRECTION COEFFICIENT |
|---|---|---|
| COMMON | GENRE<br>PLACE | 0.5<br>0.3 |
| PRODUCT | CATEGORY | 0.1 |

CORRECTION INDEX:
 MAXIMUM CORRECTION COEFFICIENT

FIG.14

| | TRANSITION SCORE | |
|---|---|---|
| | ECG UNIT B | |
| | 2011/ XX / XX | |
| TRANSITION PATTERN | NUMBER OF USAGE LOGS | CORRECTED NUMBER OF LOGS |
| A-B-C | 10 | 13 |
| A-B-D | 20 | 24 |
| A-B-E | 30 | 33 |
| C-B-A | 20 | 26 |
| C-B-D | 30 | 36 |
| C-B-E | 10 | 11 |
| D-B-A | 30 | 39 |
| D-B-C | 10 | 12 |
| D-B-E | 20 | 22 |
| E-B-A | 10 | 13 |
| E-B-C | 20 | 24 |
| E-B-D | 30 | 33 |
| F-B-A | 20 | 26 |
| F-B-C | 30 | 36 |
| F-B-D | 10 | 11 |
| TOTAL | 300 | 359 |

FIG.18

| TRANSITION SCORE WEIGHTING PATTERN 1 ||
|---|---|
| DEGREE OF WEIGHT FOR ASSOCIATION-DEGREE SCORE | DEGREE OF WEIGHT FOR TRANSITION SCORE |
| 80% | 20% |
| 20% | 80% |

| TRANSITION SCORE WEIGHTING PATTERN 2 ||
|---|---|
| DEGREE OF WEIGHT FOR ASSOCIATION-DEGREE SCORE | DEGREE OF WEIGHT FOR TRANSITION SCORE |
| 80% | 20% |
| 50% | 50% |
| 20% | 80% |

| TRANSITION SCORE WEIGHTING PATTERN 3 ||
|---|---|
| DEGREE OF WEIGHT FOR ASSOCIATION-DEGREE SCORE | DEGREE OF WEIGHT FOR TRANSITION SCORE |
| 85% | 15% |
| 65% | 35% |
| 50% | 50% |
| 35% | 65% |
| 15% | 85% |

FIG.21
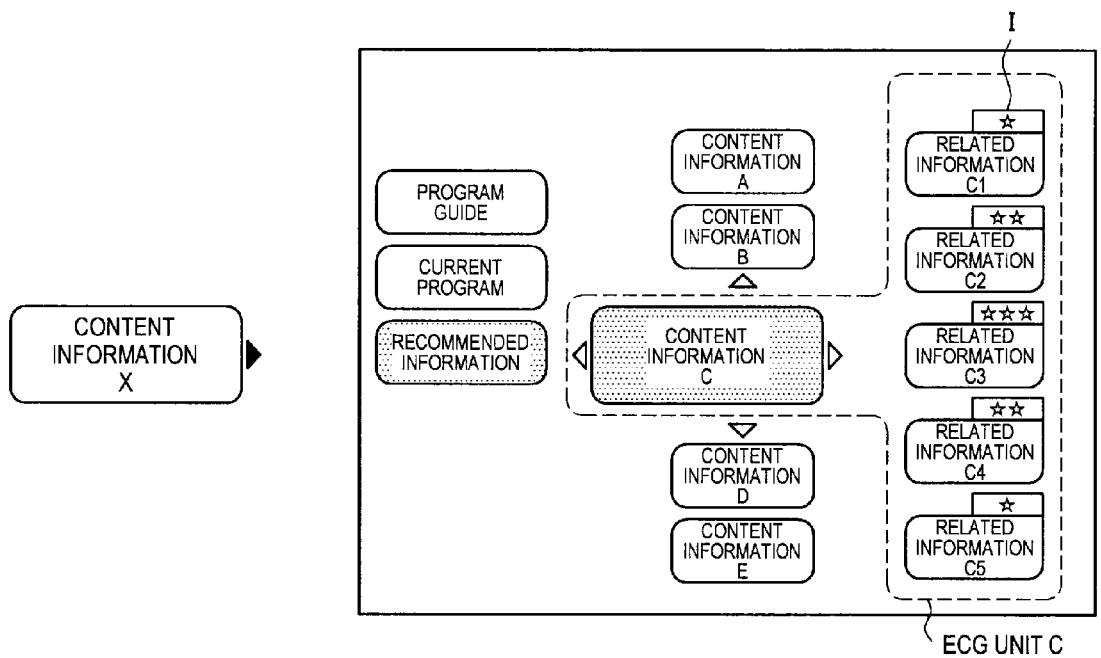
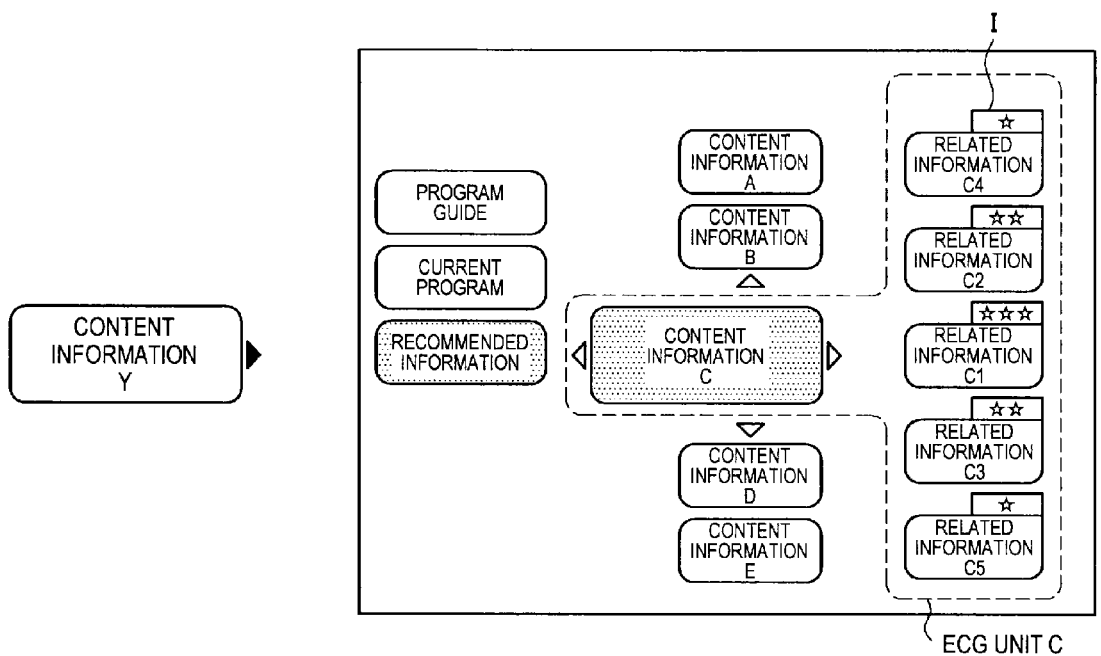

INFORMATION PROVIDING SYSTEM, INFORMATION PROVIDING METHOD, AND PROGRAM

CROSS-REFERENCE TO RELATED APPLICATION

The present application claims priority from Japanese Patent Application No. JP 2011-033542 filed in the Japanese Patent Office on Feb. 18, 2011, the entire content of which is incorporated herein by reference.

BACKGROUND

The present disclosure relates to an information providing system, an information providing method, and a program.

In the past, there has been known an information providing system for providing a user terminal or the like with a content unit formed of content information and related information of the content information. The content unit is generated automatically or semi-automatically by evaluating the degree of association of an attribute between pieces of content information. That is, the content unit is generated such that a certain piece of content information is associated with one or more pieces of related information that correspond to one or more pieces of other content information having high degree of association with the certain piece of content information. In this way, the content unit is linked to another content unit through the related information of the content unit (corresponding to the content information of the other content unit).

SUMMARY

However, in a content unit generated by evaluating a degree of association of the attribute of content information, for example, only related information having the same or similar attribute was associated with the content information, and there was a case where it is difficult to provide information with high availability.

In light of the foregoing, it is desirable to provide an information providing system, an information providing method, and a program, which are novel and improved, and which are capable of providing a content unit as the information with high availability.

According to an embodiment of the present disclosure, there is provided an information providing system which includes a content unit providing section which provides a content unit, the content unit being formed of content information and one or more pieces of related information related to the content information, and being linked to another content unit through the related information, an association-degree score calculation section which calculates an association-degree score between the pieces of content information based on a degree of association of an attribute between the pieces of content information, a usage log collection section which collects a history of operation performed for making a transition from one or more content units of link sources to one or more content units of link destinations via the content unit, as a usage log of the content unit, a transition score calculation section which calculates a transition score between the content units in a manner that a weight of a larger correction coefficient is assigned to a number of the usage logs collected during a predetermined period with respect to the content unit, as there are more attributes of content information having low degree of association with each other between the content unit of the link source and the content unit of the link destination, and a content unit generation section which generates a content unit linked to another content unit, based on the association-degree score between the pieces of content information and the transition score between the content units.

The transition score between content units may be calculated in a manner that a weight of a correction coefficient set for each attribute is assigned to the number of the usage logs, for each attribute having low degree of association with each other.

The transition score between content units may be calculated in a manner that a weight of a correction coefficient set for an attribute is assigned to the number of the usage logs, the attribute having a maximum correction coefficient among attributes each having a low degree of association with each other.

The transition score between content units may be calculated in a manner that a weight of a larger correction coefficient is assigned to the number of the usage logs, as more attributes each having low degree of association with each other are included among attributes set for each service form of information provision.

The content unit may be generated by being preferentially linked to another content unit in which a total obtained by adding the association-degree score between the pieces of content information and the transition score between the content units is high.

The content unit may be generated by being linked to another content unit in which a total is high, the total being obtained by adding the association-degree score between the pieces of content information to which a relatively high weight is assigned and the transition score between the content units to which a relatively low weight is assigned.

The content unit may be generated by being linked to another content unit in which a total is high, the total being obtained by adding the association-degree score between the pieces of content information to which a relatively low weight is assigned and the transition score between the content units to which a relatively high weight is assigned.

The content unit is may be generated by being linked to another content unit in which a total is high, the total being obtained by adding the association-degree score between the pieces of content information and the transition score between the content units, to which are assigned weights in accordance with weighting criteria set by a user.

According to another embodiment of the present disclosure, there is provided an information providing method which includes providing a content unit, the content unit being formed of content information and one or more pieces of related information related to the content information, and being linked to another content unit through the related information, calculating an association-degree score between the pieces of content information based on a degree of association of an attribute between the pieces of content information, collecting a history of operation performed for making a transition from one or more content units of link sources to one or more content units of link destinations via the content unit, as a usage log of the content unit, calculating a transition score between the content units in a manner that a weight of a larger correction coefficient is assigned to a number of the usage logs collected during a predetermined period with respect to the content unit, as there are more attributes of content information having low degree of association with each other between the content unit of the link source and the content unit of the link destination, and generating a content unit linked to another content unit, based on the association-degree score between the pieces of content information and the transition score between the content units.

According to another embodiment of the present disclosure, there is provided a program for causing a computer to execute the information providing method. Here, the program may be provided using a computer-readable recording medium or may be provided via communication means.

According to the embodiments of the present disclosure described above, there can be provided the information providing system, the information providing method, and the program, which are capable of providing a content unit as the information with high availability.

BRIEF DESCRIPTION OF THE DRAWINGS

FIG. 5 is a diagram showing a metadata example of the ECG unit;

FIG. 6 is a diagram showing a display example of the ECG unit in a user terminal;

FIG. 7 is a sequence diagram showing an operation of the ECG system;

FIG. 9 is a diagram showing a totalization example of the usage log;

FIG. 11 is a diagram showing an example of correction indices used for calculating the transition score;

FIG. 12 is a diagram showing an example of the correction index corresponding to a service form;

FIG. 14 is a diagram showing a calculation example of the transition score;

FIG. 18 is a diagram showing the generation example (3/3) of the ECG unit;

FIG. 21 is a diagram showing the display example (3/3) of the ECG unit based on the transition score.

DETAILED DESCRIPTION OF THE EMBODIMENT(S)

Figure 1:
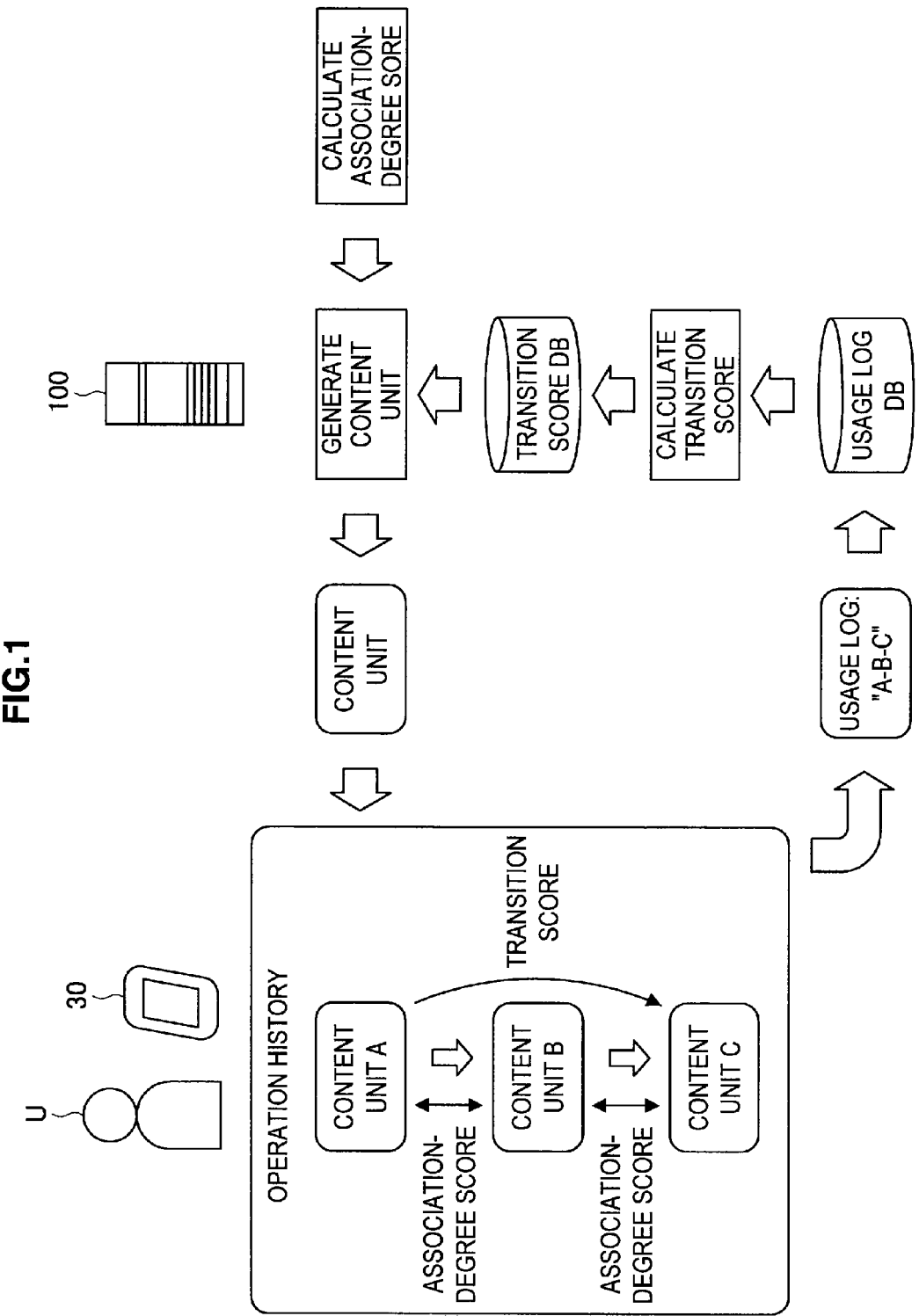
FIG. 1 is a diagram showing an outline of an information providing method according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

[1. Outline of Information Providing Method]

First, with reference to FIG. 1, an outline of an information providing method according to an embodiment of the present disclosure will be described. FIG. 1 is a diagram showing an outline of an information providing method according to an embodiment of the present disclosure.

A shown in FIG. 1, in the information providing method according to the embodiment of the present disclosure, an information providing system 100 provides a user U with a content unit through a user terminal 30. The content unit is formed of content information and related information of the content information (corresponding to the content information of another content unit), and is generated automatically or semi-automatically by calculating an association-degree score between the pieces of content information based on the degree of association of the attribute between the pieces of content information. The content unit is linked to another content unit through the related information of the content unit.

The user U performs, through a user terminal 30, an operation for viewing the content information or the related information included in the content unit, and an operation for making a transition of the viewing target from the content unit to another content unit in accordance with the link between the content units. The information providing system 100 collects, through the user terminal 30, a history of operation performed for making a transition from one or more content units of link sources to one or more content units of link destinations via the content unit, as a usage log of the content unit.

The information providing system 100 calculates a transition score between the content units based on the number of usage logs collected during a predetermined period with respect to the content unit. Here, the transition score between the content units is calculated such that, the more attributes of the content information having low degree of association with each other are included between the content unit of the link source and the content unit of the link destination, a weight of a larger correction coefficient is assigned to the number of the usage logs. Then, the information providing system 100 generates a content unit linked to another content unit based on the association-degree score between the pieces of content information and the transition score between the content units.

Here, the content unit evaluates the degree of association of two or more attributes between the pieces of content information and is liked to another content unit. Accordingly, between the pieces of content information of the linked content units, it is on the premise that they have an attribute with a certain degree of association. Note that, there is a case of including, in addition to the attribute having a certain degree of association, an attribute that does not have a certain degree of association.

In the present disclosure, in order to evaluate the content unit which causes the transition to occur between the content units of the link source and the link destination having low degree of association therebetween, a transition score between the content units is introduced. Then, by generating a content unit based on the transition score between the content units along with the degree of association (association-degree score) between the pieces of content information, there can be provided the content unit as information with high availability, in which it is possible to provide the user U with new awareness (unpredictability) through an attribute with low attribute while maintaining the association therebetween through an attribute with high association.

Further, with increase in the number of the usage logs, the transition score increases, and hence, it is difficult to expect a high score unless the availability of the content information itself is high and the content information is frequently viewed. Also, with increase in the transition score, the content unit is more likely to be linked to a large number of content units and the usage frequency thereof increases. Accordingly, by generating the content unit based on the transition score, it becomes possible to persuade a provider of the content information to provide high quality content information, and to enhance the quality of information providing service itself.

[2. Configuration of ECG System 100]

Figure 2:
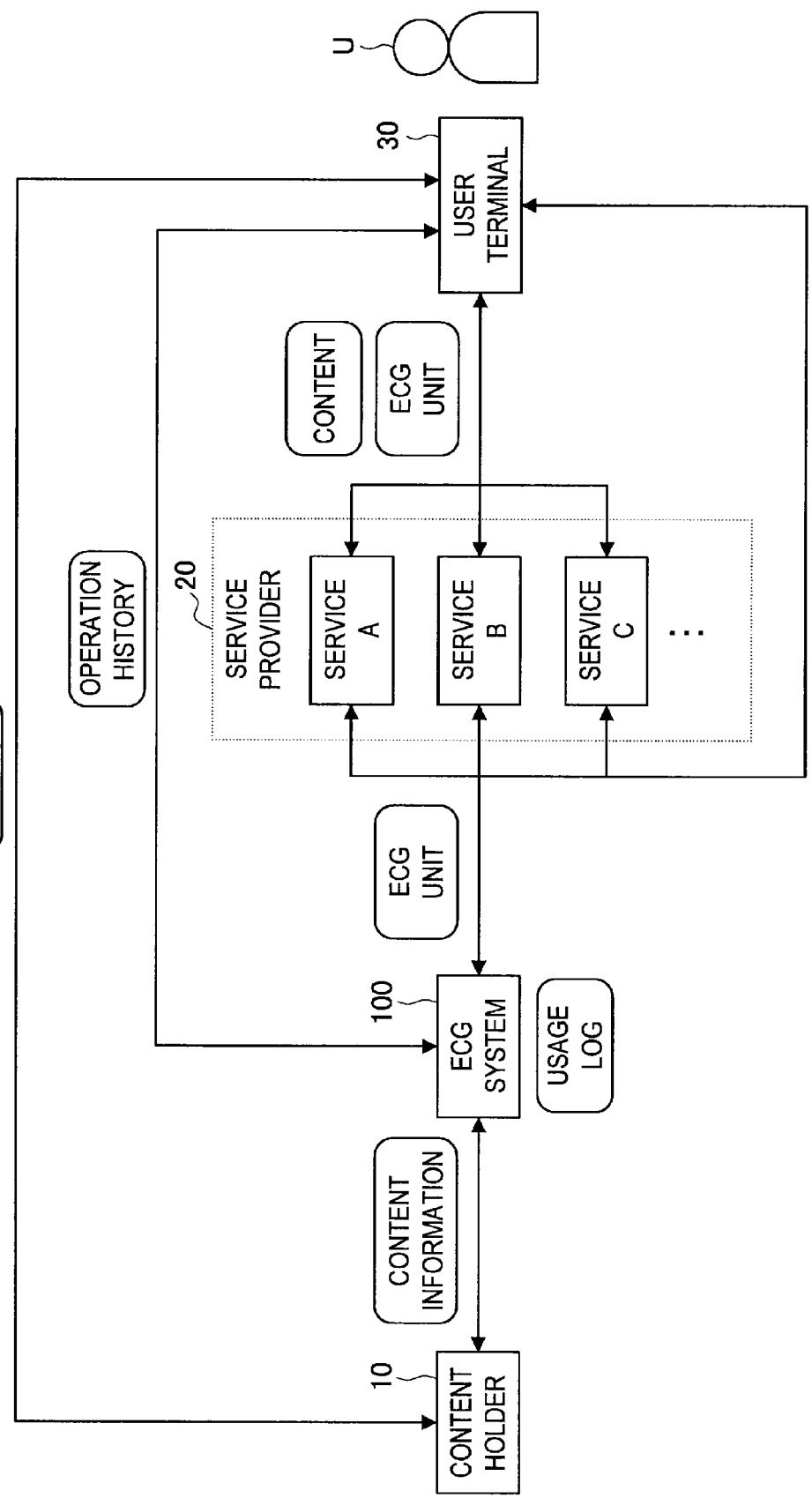
FIG. 2 is a diagram showing an outline of an ECG service according to the embodiment of the present disclosure.
Figure 3:
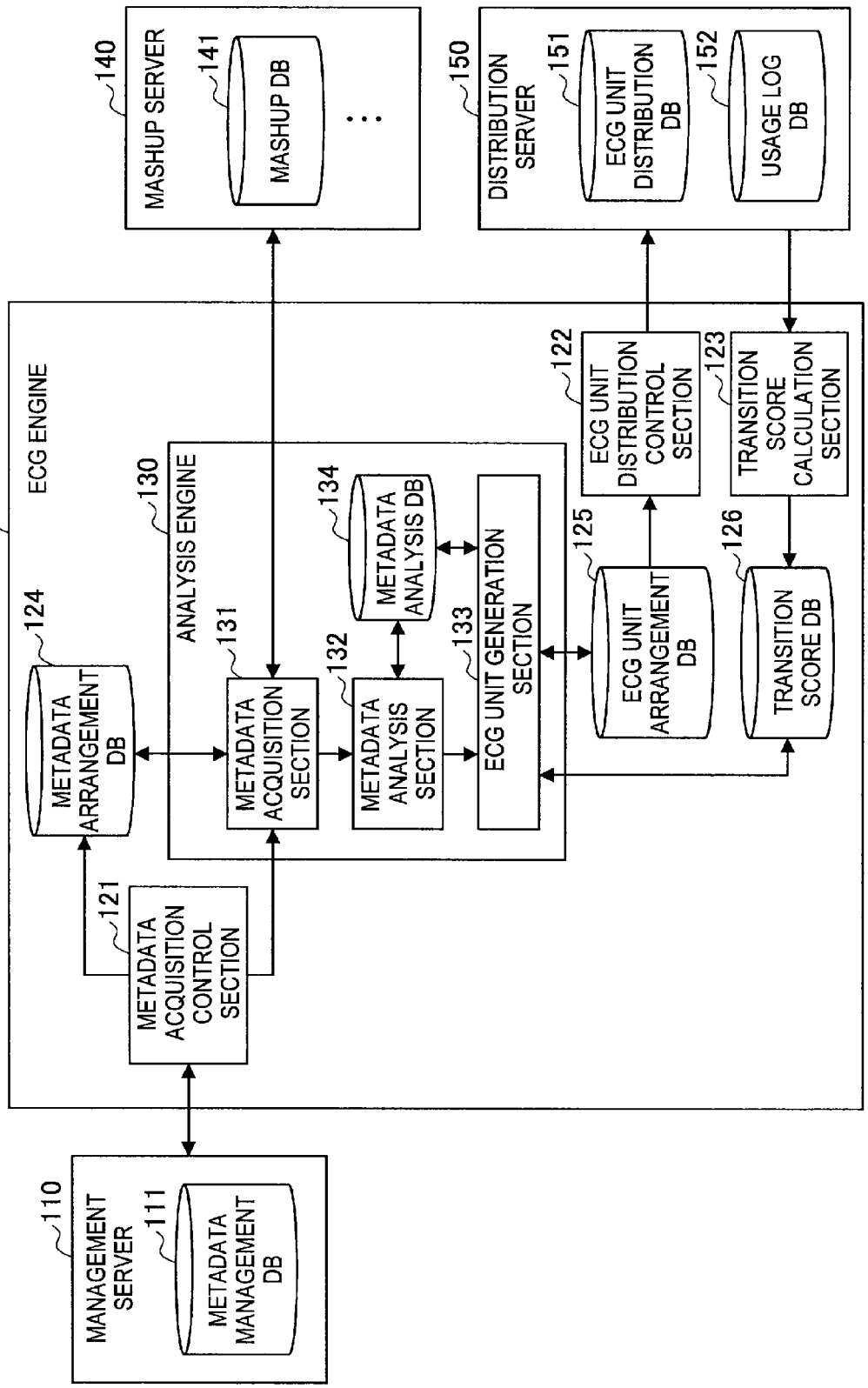
FIG. 3 is a diagram showing a configuration of an ECG system.

Next, with reference to FIG. 2 and FIG. 3, configurations of an ECG (Electronic Content Guide) service and an ECG system (information providing system) 100 according to the embodiment of the present disclosure will be described. FIG. 2 is a diagram showing an outline of an ECG service according to the embodiment of the present disclosure. FIG. 3 is a diagram showing a configuration of an ECG system.

As shown in FIG. 2, the ECG service according to the embodiment of the present disclosure is performed, with an ECG system 100 as its center, among a content holder 10, a service provider 20, and a user terminal 30. The ECG service is realized on a network.

The content holder 10 represents an enterprise entity such as a broadcaster, a sales entrepreneur, or an advertisement entrepreneur, and provides the user terminal 30 with content (substance of content) such as a program, a product, or an advertisement. The content may be provided directly to the user terminal 30, or may be provided to the user terminal 30 through the service provider 20. Further, the content holder 10 provides the ECG system 100 with the content information of the content.

The ECG system 100 represents an information providing system including a server device, a database, and the like. The ECG system 100 acquires content information from the content holder 10, and converts the acquired content information into metadata and manages the content information converted into metadata. Note that, hereinafter, the content information converted into metadata may be simply referred to as content information, according to the context. The ECG system 100 generates an ECG unit (corresponding to content unit) formed of content information and one or more pieces of related information related to the content information, and provide one or more service providers 20 with the ECG unit. Note that, although FIG. 2 shows the case where the ECG unit is provided to the user terminal 30 through the service provider 20, the ECG unit may be directly provided to the user terminal 30.

The service provider 20 represents an enterprise entity which provides services related to specific fields or general-purpose fields such as a program service, a map information service, an electronic content (music, book, application, and the like) service, and a portal service, and provides the user U with content such as a program, a map, and electronic content. The service provider 20 acquires the ECG unit from the ECG system 100, and provides the user terminal 30 with the acquired ECG unit. The ECG unit may be provided to the user terminal 30 along with the content, or an ECG unit alone may be provided to the user terminal 30.

The user terminal 30 represents a terminal operated by the user U, such as a personal computer, a PDA, a TV, or a mobile phone. The user terminal 30 acquires the content from the content holder 10 or the service provider 20 and displays/plays the acquired content, for example, or acquires the ECG unit from the ECG system 100 or the service provider 20 and displays/plays the acquired ECG unit, for example.

The user U views the content information and the related information included in the ECG unit through the user terminal 30, and performs an operation for making a transition of the viewing target between ECG units. The ECG system 100 collects, as a usage log of the ECG unit, the history of operation performed for making a transition from one or more ECG units of link sources to one or more ECG units of link destinations via the ECG unit.

As shown in FIG. 3, the ECG system 100 includes a management server 110, an ECG engine 120, a distribution server 150, and a mashup server 140. Each of the structural elements of the ECG system 100 are configured to realize the information providing method according to the embodiment of the present disclosure using hardware such as a circuit logic and/or software such as a program. The structural elements configured as the software realize the information providing method according to the embodiment of the present disclosure by executing the program on a CPU, which is not shown, for example.

The management server 110 acquires content information from a server device or the like of the content holder 10, and converts the acquired content information into metadata and manages the content information converted into metadata. The management server 110 manages the metadata of content information of a program, a product, an advertisement, or the like on a metadata management DB 111. Note that the conversion of the content information into metadata is performed by automatically or semi-automatically changing the acquired content information into a data form suitable for generating the ECG unit.

The ECG engine 120 generates the ECG unit formed of content information and one or more pieces of related information related to the content information. The ECG engine 120 includes a metadata acquisition control section 121, an analysis engine 130, an ECG unit distribution control section 122, and a transition score calculation section 123.

The metadata acquisition control section 121 regularly or irregularly acquires the metadata of content information from the management server 110 and arranges the metadata on a metadata arrangement DB 124, and issues an instruction to the analysis engine 130 to generate the ECG unit. The metadata acquisition control section 121 may acquire the metadata itself from the management server 110, and may acquire only the updated part of the metadata which is being updated and managed.

The analysis engine 130 analyzes the metadata of content information, and, based on an association-degree score between the pieces of content information and a transition score between the ECG units, the analysis engine 130 associates content information with related information (corresponding to other content information) and generates an ECG unit. The analysis engine 130 includes a metadata acquisition section 131, a metadata analysis section 132 (association-degree score calculation section), and an ECG unit generation section 133 (content unit generation section).

The metadata acquisition section 131 acquires the metadata of content information from the metadata arrangement DB 124 or the mashup server 140, and supplies the metadata analysis section 132 with the metadata of content information. The metadata analysis section 132 analyses the metadata of content information using a metadata analysis DB 134, and calculates the association-degree score between the pieces of content information. The association-degree score is calculated by evaluating the association of attributes between pieces of content information. The metadata analysis DB 134 stores data for calculating the association-degree score between the pieces of content information, the calculated association-degree score, and the like.

The ECG unit generation section 133 acquires the association-degree score between the pieces of content information from the metadata analysis section 132 or the metadata analysis DB 134, and reads out the transition score between the ECG units from a transition score DB 126. Then, the ECG unit generation section 133 associates the content information with one or more pieces of related information (other content information) based on the association-degree score and the transition score, and thereby generating the ECG unit, and the ECG unit generation section 133 stores the ECG unit along with the transition score in an ECG unit arrangement DB 125. Note that the association between pieces of content information may be performed at least partially through an operation performed by an operator.

The ECG unit distribution control section 122 stores the ECG unit and the transition score, which are stored in the ECG unit arrangement DB 125, in an ECG unit distribution DB 151 of the distribution server 150. The transition score calculation section 123 acquires a usage log of the ECG unit through the distribution server 150, calculates the transition score, and stores the transition score in the transition score DB 126.

The distribution server 150 acquires the ECG unit and the transition score through the ECG unit distribution control section 122, and manages the acquired ECG unit and the acquired transition score on the ECG unit distribution DB 151. In response to an instruction to transmit an ECG unit, the distribution server 150 transmits the specified ECG unit to the service provider 20 or the user terminal 30. Further, the distribution server 150 collects from the user terminal 30 a history of operation for making a transition from one or more ECG units of link sources to one or more ECG units of link destinations via the ECG unit, and manages the history as the usage log of the ECG unit on a usage log DB 152. In this way, the distribution server 150 functions as a content unit providing section and a usage log collection section.

The ECG unit may be generated in different configuration and different amount of information corresponding to the form (processing capacity) of the user terminal 30, for example, for a TV or for a mobile terminal. In this case, the distribution server 150 manages the ECG unit corresponding to the form of the user terminal 30, and transmits an ECG unit suitable for the user terminal 30 based on the instruction issued from the service provider 20 or the user terminal 30.

The mashup server 140 searches a plurality of mashup DB's 141 for metadata of content information corresponding to a search condition, and supplies the analysis engine 130 with a search result. The search condition is specified based on the metadata of content information used for generating the ECG unit in the analysis engine 130.

[3. ECG Unit]

Figure 4:
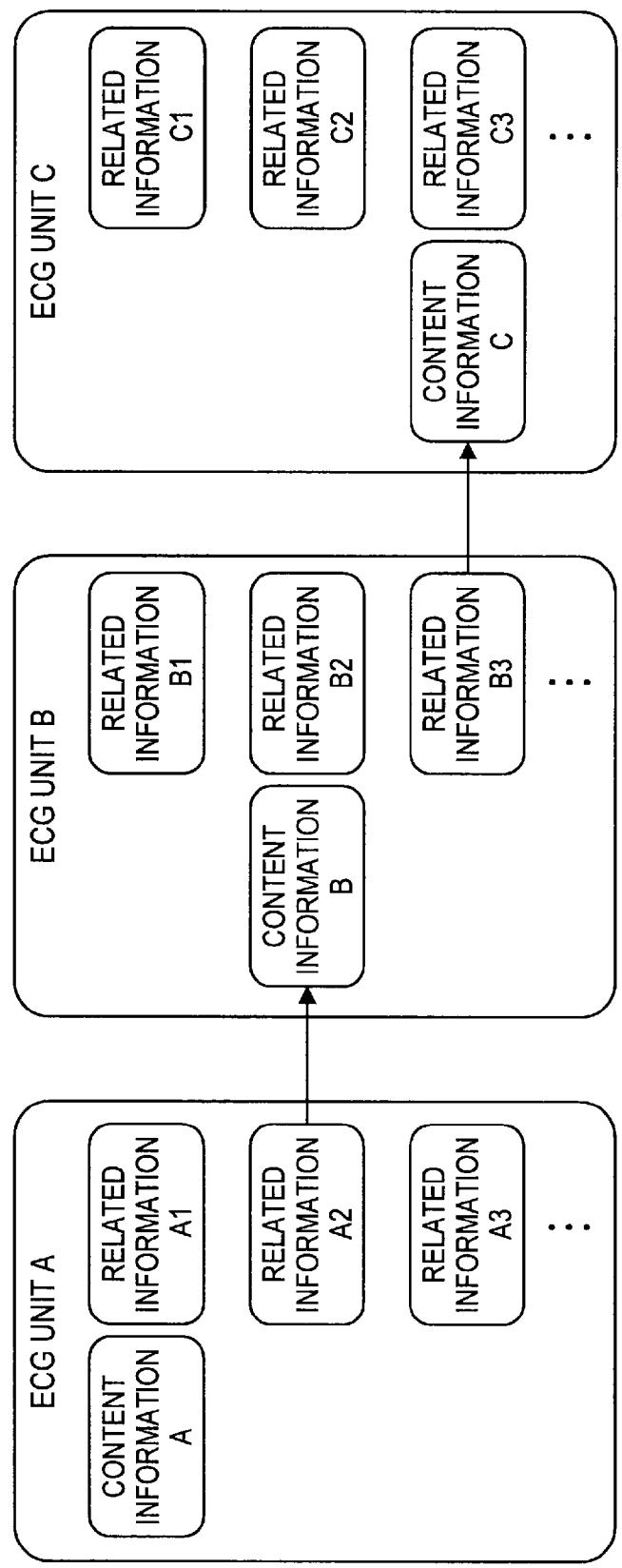
FIG. 4 is a diagram showing a configuration example of an ECG unit.

Next, with reference to FIGS. 4 to 6, an ECG unit will be described. FIG. 4 is a diagram showing a configuration example of an ECG unit. FIG. 5 is a diagram showing a metadata example of the ECG unit. FIG. 6 is a diagram showing a display example of the ECG unit in a user terminal.

In FIG. 4, there is shown a configuration example of an ECG unit A, an ECG unit B, and an ECG unit C. The ECG unit is formed of content information and one or more pieces of related information related to the content information. The content information and the related information (corresponding to other content information) are associated with each other based on a degree of association of one or more attributes between the pieces of content information. In this way, the ECG unit is linked to another ECG unit through the related information of the ECG unit (corresponding to the content information of the other ECG unit).

The content information is formed of information related to content such as a program, a product, and an advertisement. For example, the content information of a program includes a title, series information, a genre, casts, a reference destination URL of a program logo image, a reference destination URL of a representative image, date/time of broadcast start/end, a channel, and a period of validity. The related information corresponds to content information of a program, a product, an advertisement, or the like related to the content information. For example, the related information of a program includes an ID of an ECG unit of a reference destination, a title of content information of the ECG unit of the reference destination, a reference destination URL of a representative image, and a period of validity.

The reference destination URL provides the user terminal 30 with reference destination data as a part of the ECG unit, or is used for causing the reference destination data to be accessible from the user terminal 30. The ID of the ECG unit of the reference destination is used for linking ECG units to each other through the related information.

For example, the ECG unit A is formed of content information A and related information A1, A2, A3, . . . , which are related to the content information A, and the related information A2 corresponds to content information B which is related to the content information A. Accordingly, the ECG unit A is linked to the ECG unit B through the related information A2 of the ECG unit A (corresponding to the content information B of the ECG unit B). In the same manner, the ECG unit B is linked to the ECG unit C through related information B3 of the ECG unit B (corresponding to content information C of the ECG unit C).

Examples of the content to be the content information include programs such as a broadcast program, a VOD program, an IPTV program, and a radio program, products for online electronic commerce (such as a book, a DVD, a CD, a consumer electronics device, and clothes), and advertisements such as broadcast commercials. Further, examples of the content to be the content information may include persons (such as an actor/actress, a living person, and a historical person), places (such as a tourist spot and a shopping spot), and descriptions of historical backgrounds (such as 1970s and 20th century).

In FIG. 5, there is shown a metadata example of an ECG unit for a program. The metadata of the ECG unit is created using a description language such as an XML (Extensible Markup Language). Note that the metadata of the ECG unit may have a different configuration from that of the metadata shown in FIG. 5.

As shown in FIG. 5, the metadata of the ECG unit is formed of ECG unit-definition metadata, content information metadata, and one or more pieces of related information metadata. The ECG unit-definition metadata includes an ECG unit ID, a display format, a network ID, a service ID, distribution start date/time, and the like. The content information metadata includes a title of the content (program), a subtitle, a URL of a representative image, and a URL of another image. The related information metadata includes an ID, a type, an information source, an ID of an ECG unit of a link (reference) destination, and the like of the related information.

For example, ID=001 is allocated to related information 1, and the related information 1 corresponds to the content information of a program (program), and is linked to the ECG unit of ECG unit ID="00033100". Further, the related information 1 includes metadata (main title, subtitle, and image URL) related to content information corresponding to the related information 1. Further, related information 2 corresponds to the content information of a person (person), related information 3 corresponds to the content information of an advertisement (ad), and related information 4 corresponds to the content information of a product (cc). The pieces of related information 1 to 3 are each (direct) metadata obtained through the distribution server 150, and the related information 4 is the metadata obtained through the mashup server 140.

In the metadata example, the subtitle of the content information reads "Costarring Actor A and Actor B, popular piece in 2010", and the subtitle of the related information 1 reads "Starring Actor A, top-rated TV program in 2009". Accordingly, it is determined that the degree of association of attributes between the content information and the related information 1 satisfies a predetermined criterion, based on the association that they have the same actor and are both programs that are drawing attention. Further, it is determined that the degree of association of attribute with the related information 2 satisfies a predetermined criterion based on the association that the actor is the same, it is determined that the degree of association of attribute with the related information 3 satisfies a predetermined criterion based on the association that the advertisement is from the program sponsor "xyz company", and it is determined that the degree of association of attribute with the related information 4 satisfies a predetermined criterion based on the association that the product is from the program sponsor.

Note that examples of the attribute of the program include, in addition to the above, series information, a genre, casts, date/time of broadcast start/end, and a channel, and examples of the attributes of the person include birthplace, age group, constellation, and a group the person belongs to. Examples of the attribute information of the advertisement include a sponsor, a genre, a creator, casts, and date/time of advertisement start/end, and examples of attribute information of the product include a category, a handling site, a price range, a manufacturer, and date/time of sales start/end.

In FIG. 6, there is shown a display example of the ECG unit in the user terminal 30. In this example, there is shown a menu in the left hand region formed of "program guide", "current program", and "recommended information", and "recommended information" is being selected. Note that FIG. 6 merely shows a display example of the ECG unit, and the ECG unit may be displayed in various form/mode.

In the central region, pieces of content information A, B, C, D, and E are displayed from top to bottom, and the content information C is being focused on and is being enlarged and displayed. In the right hand region, pieces of related information C1, C2, C3, C4, C5, ... of the content information C are displayed from top to bottom. Accordingly, in the central and right hand regions, there is displayed an ECG unit C formed of the content information C and the pieces of related information C1, C2, C3, C4, C5, .... Note that the dashed line drawn in FIG. 6 shows the configuration of the ECG unit C, but is not displayed in the display region.

The user U can move the focus on the display region. When the focus is moved downward in a state ST61, the display is scrolled upward in the central region, and, as shown in a state ST62, pieces of content information B, C, D, E, and F are displayed from top to bottom, and the content information D is being focused on and is being enlarged and displayed. Then, in the right hand region, pieces of related information D1, D2, D3, D4, D5, ... of the content information D are displayed from top to bottom. Accordingly, in the central and the right hand regions, there is displayed an ECG unit D formed of the content information D and the pieces of related information D1, D2, D3, D4, D5, ....

When the focus is moved in the right direction in the state ST62, the related information D3 is focused in the right hand region, and after that, the display is scrolled in the left direction in the central and right hand regions. Then, as shown in a state ST63, in the central region, there are displayed, from top to bottom, the pieces of content information G to K corresponding to the pieces of related information D1 to D5, respectively, and the content information I corresponding to the related information D3 is being focused on and is being enlarged and displayed. In the right hand region, pieces of related information I1, I2, I3, I4, I5, ... of the content information I are displayed from top to bottom.

[4. Operation of ECG System 100]

Next, with reference to FIGS. 7 to 18, operation of the ECG system 100 will be described.

As shown in FIG. 7, the management server 110 acquires content information from the content holder 10, and converts the acquired content information into metadata and manages the content information converted into metadata (Step S11). The ECG engine 120 generates, based on the metadata of the content information, an ECG unit formed of the content information and one or more pieces of related information related to the content information (Step S12), and provides the ECG unit for the distribution thereof. The related information is selected based on an association-degree score calculated using the degree of association of an attribute between the pieces of content information. Note that, here, a case is assumed where a transition score between the ECG units based on a usage log is not stored yet.

The distribution server 150 transmits the ECG unit to the service provider 20 in response to a transmission instruction from the service provider 20, or automatically distributes the ECG unit (Step S13). The service provider 20 transmits the ECG unit to the user terminal 30 in response to a transmission instruction from the user terminal 30, or automatically distributes the ECG unit. The user terminal 30 processes and displays the received ECG unit (Step S14).

The user U views the content information and the related information included in the ECG unit and performs operation for making a transition of the viewing target from the content unit to another content unit in accordance with the ECG unit link, through the user terminal 30 (Step S15). The user terminal 30 transmits an ECG unit-transmission instruction to the service provider 20 in accordance with a user operation. The user terminal 30 transmits, to the distribution server 150, a history of operation performed for making a transition from one or more ECG units of link sources to one or more ECG units of link destinations via the ECG unit, and the distribution server 150 collects the operation history (Step S16).

The distribution server 150 generates and totalizes usage logs using the operation history with respect to the ECG unit collected during a predetermined period (Step S17). The ECG engine 120 calculates and stores an association-degree score indicating a degree of association of an attribute between the pieces of content information in order to generate the ECG unit (Step S18). Note that the association-degree score may be calculated and stored in advance, at the time point that is different from the time point of generating the ECG unit. Further, the ECG engine 120 calculates and stores a transition score between the ECG units based on the totalization result of the usage logs (Step S19). The transition score between the ECG units is calculated in a manner that a weight of a larger correction coefficient is assigned to the number of the usage logs, as there are more attributes of the content information having low degree of association with each other between the content unit of the link source and the content unit of the link destination.

The ECG engine 120 generates and stores the ECG unit based on the association-degree score between the pieces of content information and the transition score between the ECG units (Step S20). The distribution server 150 distributes the ECG unit acquired from the ECG engine 120 (Step S21). The ECG unit is transmitted to the user terminal 30 via the service provider 20 in response to a transmission instruction from the user terminal 30, or is automatically distributed. The user terminal 30 processes and displays the received ECG unit (Step S22). The user terminal 30 may receive the transition score along with the ECG unit, and may process the ECG unit based on the transition score. The user U performs viewing/transition operation through the user terminal 30 (Step S23).

Figure 8:
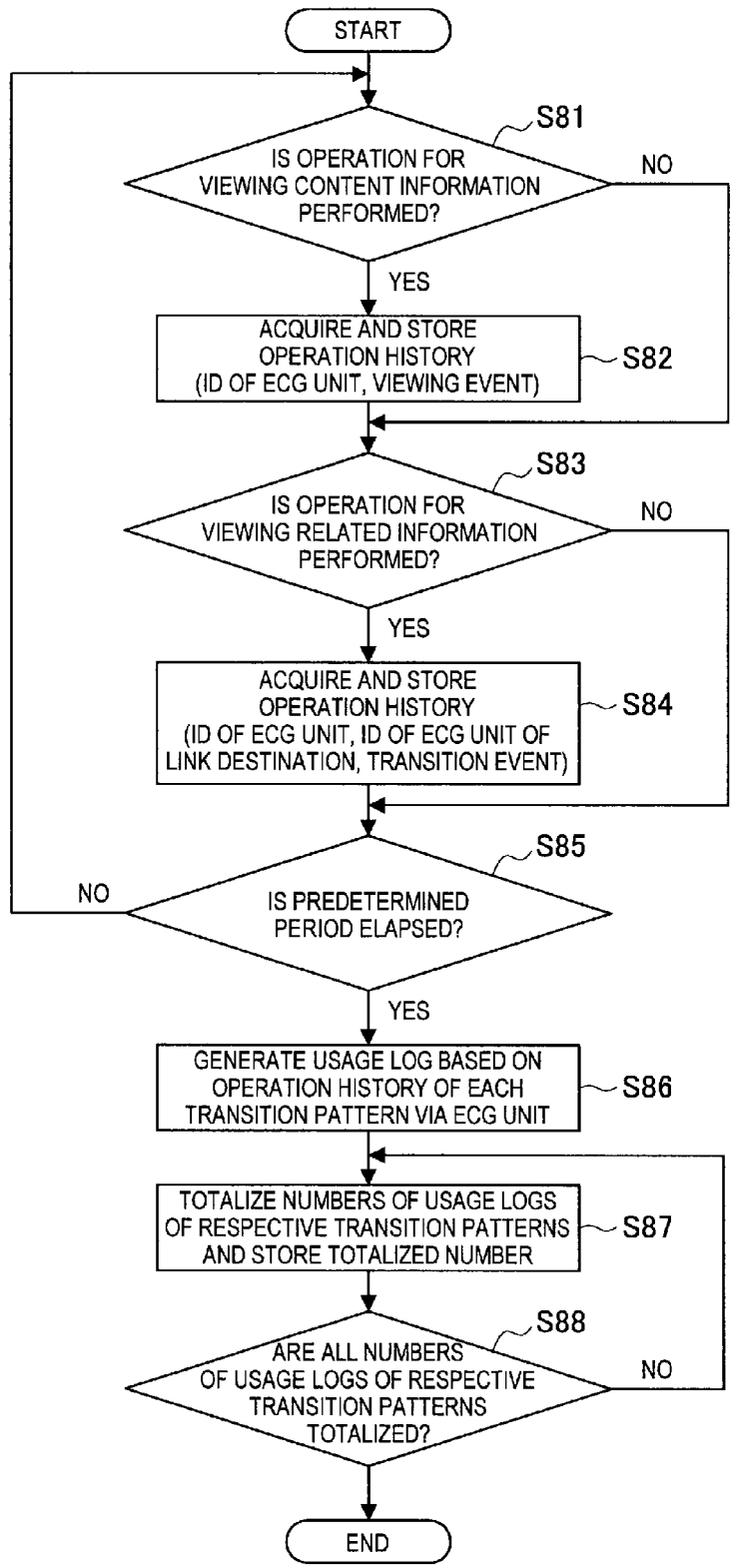
FIG. 8 is a flowchart showing a totalization procedure of a usage log.

FIG. 8 is a flowchart showing a totalization procedure of a usage log. FIG. 9 is a diagram showing a totalization example of the usage log. The totalization processing of the usage log is performed by the distribution server 150 in accordance with the procedure shown in FIG. 8. The user terminal 30 provides the distribution server 150 with the history of the viewing/transition operation of the ECG unit performed by the user U by using a program for a GUI.

If the user U performs an operation for viewing content information ("Yes" in Step S81), the distribution server 150 acquires from the user terminal 30 and stores a history of operation (ID of ECG unit including content information, event attribute: viewing) (Step S82). Further, if the user U performs an operation for viewing related information ("Yes" in Step S83), the distribution server 150 acquires from the user terminal 30 and stores a history of operation (ID of ECG unit including related information, ID of ECG unit of link destination, event attribute: transition) (Step S84). Note that the operation history also includes information indicating date/time of performing the operation. The distribution server 150 repeats the processing from Steps S81 to S84 until a predetermined period elapses ("Yes" in Step S85).

After the predetermined period elapses, the distribution server 150 generates a usage log based on the operation history of each transition pattern via the ECG unit (Step S86). For example, the transition pattern via the ECG unit B includes the transition patterns of ECG unit A-ECG unit B-ECG unit C, ECG unit A-ECG unit B-ECG unit D, . . . , and the like. The usage log of the ECG unit is generated by extracting, from the operation history, a history of operation performed for making a transition from one or more ECG units of link sources to one or more ECG units of link destinations via the ECG unit.

The distribution server 150 totalizes the numbers of usage logs generated from the operation history collected during the predetermined period for each transition pattern of the ECG unit based on the information indicating operation date/time, and stores the totalized number in the usage log DB 152 (Step S87). Note that the predetermined period is set to one day, one week, one month, or the like. Then, until the distribution server 150 totalizes all the numbers of usage logs of respective transition patterns with respect to the ECG unit ("Yes" in Step S88), the processing of Step S87 is repeated.

In the example shown in FIG. 9, first, on the user terminal 30, the ECG unit A including the content information A and the related information A1 is displayed. In this sate, the content information A is being focused on and, and an operation history (ID of ECG unit A, event attribute: viewing) is acquired (state ST91). When the focus is moved from the content information A to the related information A1, transition occurs from the ECG unit A to the ECG unit B, which is the link destination, and an operation history (ID of ECG unit A, ID of ECG unit B, event attribute: transition) is acquired (state ST92).

Then, the ECG unit B including the content information B and the related information B1 is acquired from the distribution server 150 and displayed. In this sate, the content information B corresponding to the related information A1 is being focused on and, and an operation history (ID of ECG unit B, event attribute: viewing) is acquired (state ST93). When the focus is moved from the content information B to the related information B1, transition occurs from the ECG unit B to the ECG unit C, which is the link destination, and an operation history (ID of ECG unit B, ID of ECG unit C, event attribute: transition) is acquired (state ST94).

Then, the ECG unit C including the content information C and the related information C1 is acquired from the distribution server 150 and displayed. In this sate, the content information C corresponding to the related information B1 is being focused on and, and an operation history (ID of ECG unit C, event attribute: viewing) is acquired (state ST95). In this way, a history of operation is acquired, the operation being performed for causing transition between the ECG units to occur from the ECG unit A of the link source to the ECG unit C of the link destination on the basis of the ECG unit B.

Next, based on the operation history, a log "ECG unit A-ECG unit B-ECG unit C" (or "ECG unit A-ECG unit C") is generated as one of the usage logs of the ECG unit B. The usage log includes at least the ID of the source ECG unit (for example, ECG unit A) and the ID of the destination ECG unit (for example, ECG unit C).

Figure 10:
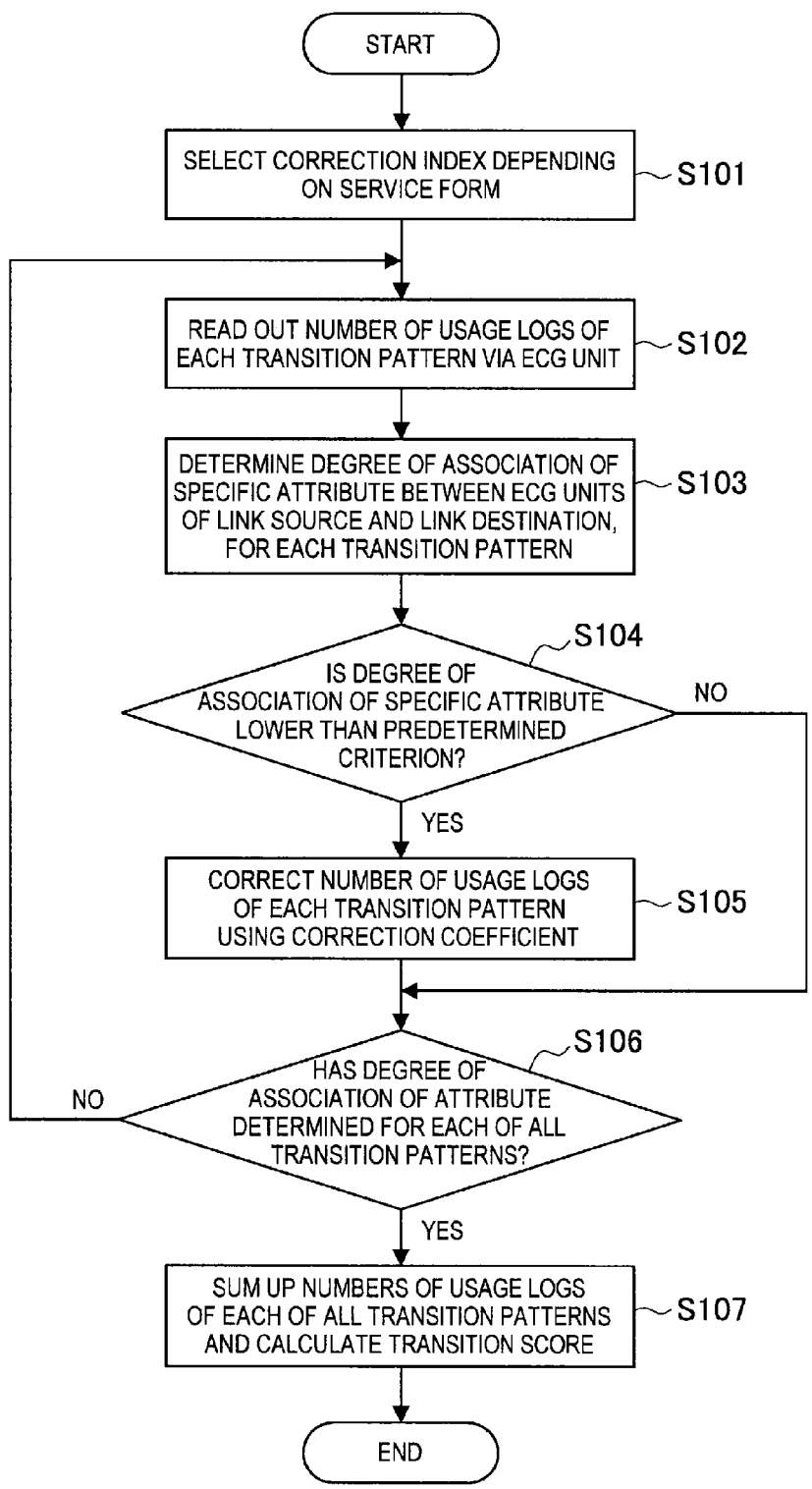
FIG. 10 is a flowchart showing a calculation procedure of a transition score.
Figure 13:
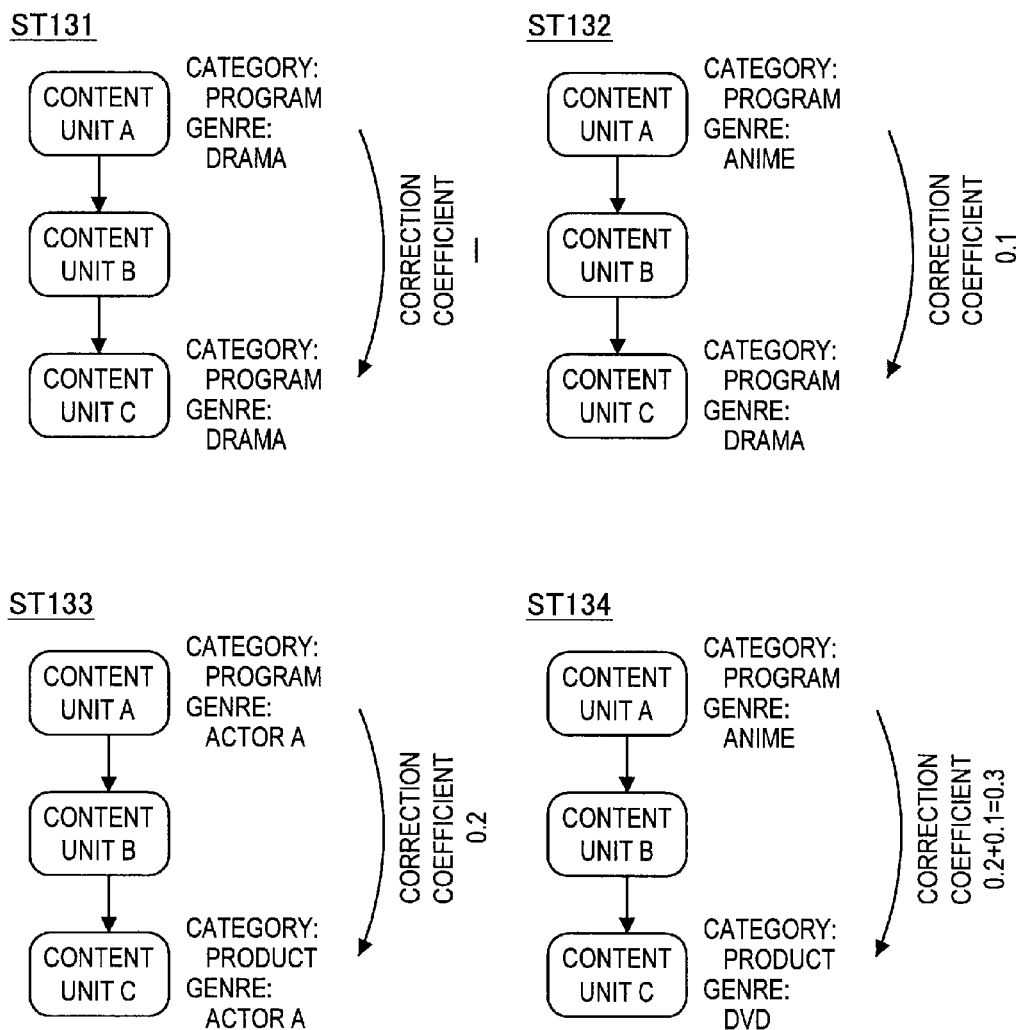
FIG. 13 is a diagram showing an example of a correction coefficient used for calculating the transition score.

FIG. 10 is a flowchart showing a calculation procedure of a transition score. FIG. 11 is a diagram showing an example of correction indices used for calculating the transition score. FIG. 12 is a diagram showing an example of the correction index corresponding to a service form. FIG. 13 is a diagram showing an example of a correction coefficient used for calculating the transition score. FIG. 14 is a diagram showing a calculation example of the transition score. The calculation processing of the transition score is performed by the transition score calculation section 123 in accordance with the procedure shown in FIG. 10.

The transition score calculation section 123 selects a correction index to be used for calculating the transition score depending on a service form (Step S101). The correction index is used for determining whether there is included an attribute of content information having low degree of association between the ECG unit of the link source and the ECG unit of the link destination. The correction index may be set depending on the service form of the service provider 20, which is to be a providing destination of the ECG unit, or may be set regardless of the service form.

The transition score calculation section 123 reads out, from the usage log DB 152, the number of usage logs of each transition pattern with respect to the ECG units, the transition score between which is to be calculated (Step S102). For example, as the usage log of the ECG unit B, the number of usage logs of the transition pattern ECG unit A-ECG unit B-ECG unit C, the number of usage logs of the transition pattern ECG unit A-ECG unit B-ECG unit D, . . . are read out.

The transition score calculation section 123 determines the degree of association of a specific attribute set as a correction index between the ECG units of the link source and the link destination, for each transition pattern (Step S103). That is, it is determined whether the degree of association of the specific attribute between the ECG units of the link source and the link destination is lower than a predetermined criterion (Step S104). The predetermined criterion is set to be lower than the criterion used when determining the association between pieces of content information using an association-degree score. For example, it is determined that the degree of association of attribute is low in the transition pattern ECG unit A-ECG unit B-ECG unit C, the degree of association of attribute is high in the transition pattern ECG unit A-ECG unit B-ECG unit D, . . . .

The transition score calculation section 123 corrects the number of usage logs as necessary, based on the degree of association of attribute of each transition pattern. The number of usage logs is corrected such that, in the case where the degree of association of attribute is lower than the predetermined criterion ("Yes" in Step S104), the number of usage logs is multiplied by the number obtained by adding 1 to a correction coefficient (Step S105). The correction coefficient is used for correcting the number of usage logs of the ECG unit in accordance with the degree of association of attribute between the pieces of content information, between the ECG units of the link source and the link destination via the ECG unit. The correction coefficient is set such that, in the case where the degree of association of a specific attribute between pieces of content information is low, as the possibility that new awareness (unpredictability) is provided to the user U becomes high, the higher correction coefficient is set. In the example described above, the number of usage logs of the transition pattern ECG unit A-ECG unit B-ECG unit C is corrected, and on the other hand, the number of usage logs of the transition pattern ECG unit A-ECG unit B-ECG unit D is not corrected.

When the processing described above is completed for all transition patterns of the ECG unit ("Yes" in Step S106), the transition score calculation section 123 sums up the numbers of usage logs of transition patterns and calculates the transition score of the ECG unit (Step S107). The transition score is associated with the ECG unit and is stored in the transition score DB 126.

In the example shown in FIG. 11, correction indices are set by being classified into respective items of common, program, product, and advertisement. For example, in the item of common, with respect to correction indices of "genre", "sub-genre", "place (filmed location)", and "target age group" of content, correction coefficients of 0.5, 0.1, 0.3, and 0.2 are set, respectively. In this example, the case is assumed in which, when the degree of association "genre" is low, the possibility that new awareness is provided to the user U is the highest. For example, in the case where the genre of the content is set to the correction index (correction coefficient 0.5), it is determined whether the genre of the content information satisfies the degree of association of the predetermined criterion between the ECG units of the link source and the link destination. Note that the correction index and the correction coefficient may be changed or added in accordance with the trend or the like of the content.

For example, when the genre of the content information of the ECG unit A as the link source is "anime", and the genre of the content information of the ECG unit C as the link destination is "manga", the similarity of genre is high, and it is determined that the degree of association of attribute satisfies the predetermined criterion. In this case, the number of usage logs of the transition pattern ECG unit A-ECG unit B-ECG unit C is not corrected. On the other hand, when the genre of the content information of the ECG unit D as the link destination is "documentary", the similarity of genre is low, and it is determined that the degree of association of attribute is low. In this case, when the number of usage logs of the transition pattern ECG unit A-ECG unit B-ECG unit D is 10, the correction coefficient (for example, 0.5) is taken into consideration and the number of usage logs is corrected to 15.

In the example shown in FIG. 12, the correction index is set depending on the service form of the service provider 20, which is to be a providing destination of the ECG unit. For example, in a service form A which provides a service on general-purpose fields, "genre" among the items of common shown in FIG. 11 is adopted as the correction index. In this case, when the degree of association of the correction index (genre) is determined to be low between the ECG units of the link destination and the link source, the number of usage logs is corrected with the correction coefficient (0.5) set to the correction index.

In the same manner, in a service form B which provides a program service, "genre" and "target age group" among the items of common are adopted as the correction indices, and "broadcast period" among the items of program is adopted as the correction index. In this case, when the degree of association of each correction index is determined to be low between the ECG units of the link destination and the link source, the number of usage logs is corrected with the total value obtained by adding together the correction coefficients of correction indices which are determined to have low degree of association. For example, when it is determined that the degree of association is low in both "genre" and "broadcast period", the total 0.6 (=0.5+0.1) obtained by adding correction coefficients of "genre" and "broadcast period" is applied.

In the same manner, in a service form C which provides a product service, "genre" and "place" among the items of common are adopted as the correction indices, and "category" among the items of product is adopted as the correction index. In addition, it is set to use the correction index having the maximum correction coefficient. In this case, when the degree of association of two or more correction indices is determined to be low between the ECG units of the link destination and the link source, the number of usage logs is corrected with the maximum correction coefficient among the correction coefficients of the correction indices which are determined to have low degree of association. For example, when it is determined that the degree of association is low in both "genre" and "category", the correction coefficient 0.5 of "genre" having the maximum correction coefficient is applied.

In the example shown in FIG. 13, there is shown an example of a correction coefficient used for calculating the transition score. For example, as shown in a state ST131, when the categories of the ECG unit A and the ECG unit C are both "program", and the genres of the ECG unit A and the ECG unit C are both "drama", the categories are the same with each other and the genres are the same with each other, and therefore, the correction coefficient is not applied. In this case, the ECG unit B is not evaluated as an ECG unit for linking ECG units having content information with different attributes.

As shown in a state ST132, when the categories of the ECG unit A and the ECG unit C are both "program", and the genres of the ECG unit A and the ECG unit C are "anime" and "drama", respectively, the categories are the same with each other and the degree of similarity between the genres is low, and therefore, the correction coefficient (0.1) of "genre" is applied. In this case, the ECG unit B is evaluated as an ECG unit for linking ECG units having content information with different genres, that is, the ECG unit B is evaluated as an ECG unit that may provide the user with new awareness.

As shown in a state ST133, when the categories of the ECG unit A and the ECG unit C are "program" and "product", respectively, and the genres are both "Actor A", the degree of similarity between the categories is low and the genres are the same with each other, and therefore, the correction coefficient (0.2) of "category" is applied. In this case, the ECG unit B is evaluated as an ECG unit for linking ECG units having content information with different categories, that is, the ECG unit B is evaluated as an ECG unit that may provide the user with new awareness.

As shown in a state ST134, when the categories of the ECG unit A and the ECG unit C are "program" and "product", respectively, and the genres of the ECG unit A and the ECG unit C are "anime" and "DVD", respectively, the degree of similarity between the categories and the degree of similarity between the genres are both low, and therefore, the total (0.3) obtained by adding the correction coefficient (0.2) of category and the correction coefficient (0.1) of genre is applied. In this case, the ECG unit B is evaluated as an ECG unit for linking ECG units having content information with different categories and genres, that is, the ECG unit B is evaluated as an ECG unit that may provide the user with new awareness.

In the example shown in FIG. 14, there are shown transition scores calculated based on the number of usage logs of the ECG unit B during one day. Here, a case is assumed in which the ECG units A to F are linked to one another. For example, after the number of usage logs of the transition pattern ECG unit A-ECG unit B-ECG unit C is totalized as 10, by taking into consideration the degree of association of attribute between the pieces of content information, between the ECG unit A and the ECG unit C, the number of usage logs is corrected to 15. In this case, the degree of association of correction index between the ECG unit A and the ECG unit C is considered to be low, and therefore, the number of usage logs is corrected.

In the same manner, the number of usage logs of the transition pattern ECG unit A-ECG unit B-ECG unit D is corrected from 20 to 24, and the number of usage logs of the transition pattern ECG unit A-ECG unit B-ECG unit E is corrected from 30 to 33. Then, the transition score of the ECG unit B is calculated as the total of the numbers of usage logs of all transition patterns.

Figure 15:
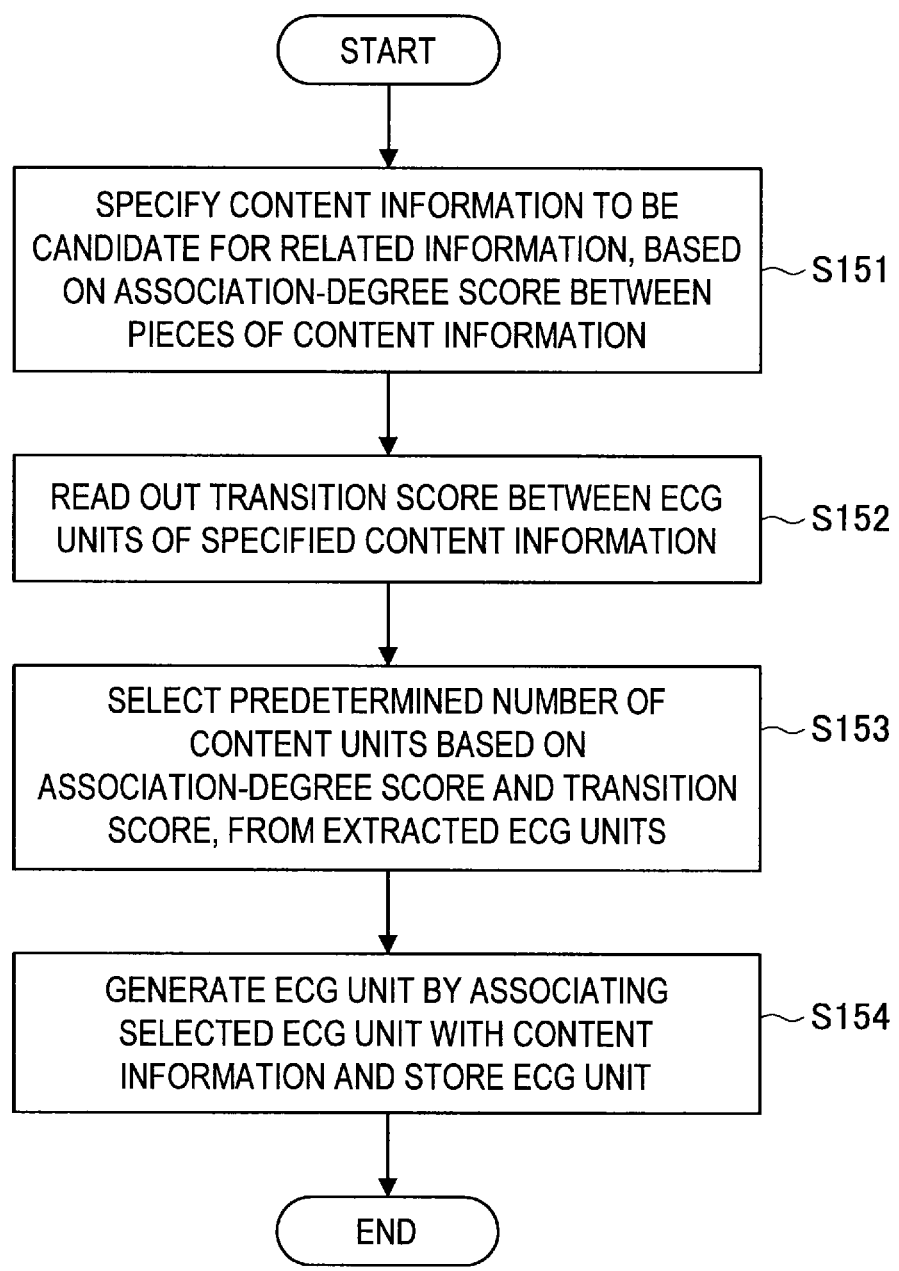
FIG. 15 is a flowchart showing a generation procedure of the ECG unit.
Figure 16:
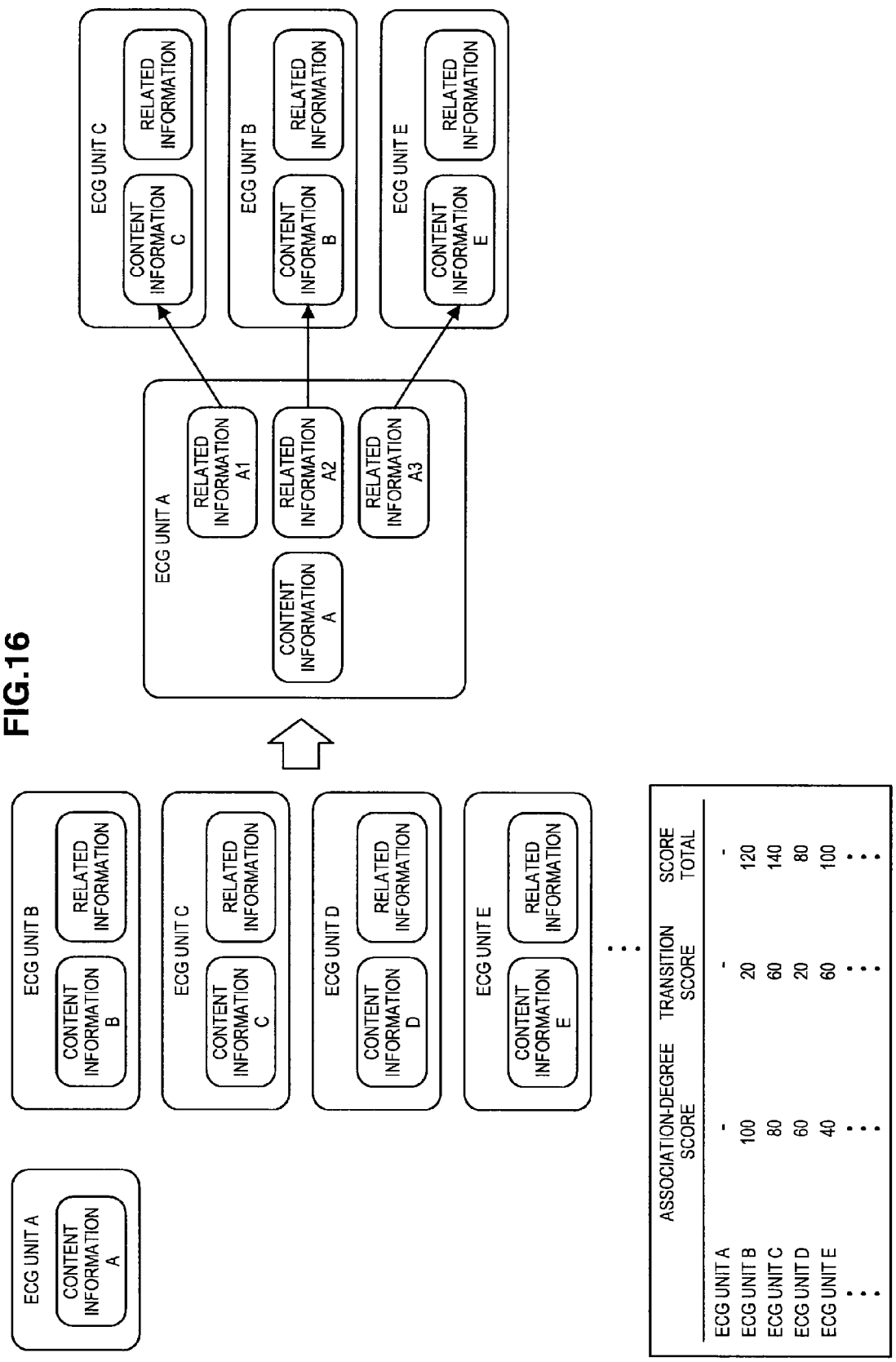
FIG. 16 is a diagram showing a generation example (1/3) of the ECG unit.
Figure 17:
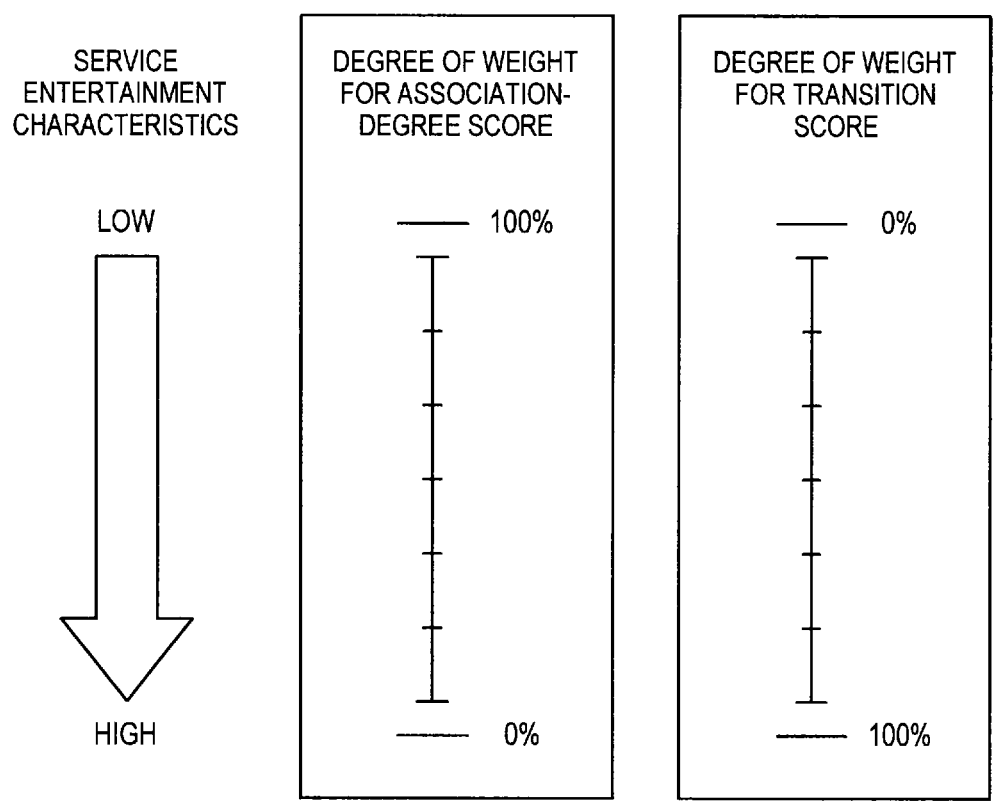
FIG. 17 is a diagram showing the generation example (2/3) of the ECG unit.

FIG. 15 is a flowchart showing a generation procedure of the ECG unit. FIGS. 16 to 18 are each a diagram showing a generation example of the ECG unit. The generation processing of the ECG unit is performed by the ECG unit generation section 133 in accordance with the procedure shown in FIG. 15.

The ECG unit generation section 133 generates the ECG unit by associating content information with one or more pieces of related information related to the content information. Using the metadata analysis DB 134, the ECG unit generation section 133 specifies a predetermined number of pieces of content information to be candidates for the related information, based on the association-degree score indicating the degree of association of an attribute between the pieces of content information (Step S151). The predetermined number is determined by taking into account a certain degree of room for the number of pieces of related information forming the ECG unit.

The ECG unit generation section 133 reads out the transition score between the ECG units of the specified content information from the transition score DB 126 (Step S152). Based on the association-degree score of the specified content information and the transition score of the ECG unit of the content information, the ECG unit generation section 133 selects the predetermined number of pieces of content information (Step S153). The predetermined number of pieces of content information are preferentially selected in order from the content information having a higher total value obtained by adding the association-degree score and the transition score, for example. Note that the calculation of the total value obtained by adding the association-degree score and the transition score will be described later.

The ECG unit generation section 133 generates an ECG unit by associating the content information of the ECG unit with the predetermined number of pieces of content information as the related information, and stores the ECG unit along with the transition score in the ECG unit arrangement DB 125 (Step S154). In this way, the ECG unit is linked to another ECG unit through the content information associated therewith as the related information.

In the example shown in FIG. 16, the ECG unit A is generated based on the total value obtained by adding the association-degree score between pieces of content information and the transition score between the ECG units. First, the ECG unit B, the ECG unit C, the ECG unit D, the ECG unit E, . . . are extracted, which have the pieces of content information B, C, D, E, . . . , respectively, the pieces of content information B, C, D, E, . . . each having high association-degree score of attribute with the content information A of the ECG unit A.

Next, with respect to each extracted ECG unit, there are selected, in order from the one having a higher total value obtained by adding the association-degree score between pieces of content information and the transition score between the ECG units, the ECG unit C, the ECG unit B, and the ECG unit E, as the predetermined number of ECG units, for example. Then, the related information A1 corresponding to the content information C of the ECG unit C, the related information A2 corresponding to the content information B of the ECG unit B, and the related information A3 corresponding to the content information E of the ECG unit E are each associated with the content information A of the ECG unit A.

In this way, the ECG unit A which is linked to the ECG units B, C, and E is generated. Note that the selection of ECG units may also be performed such that a predetermined number of ECG units are preferentially selected in order from the ECG unit having a higher transition score, from among the ECG units each having the association-degree score between pieces of content information equal to or more than a predetermined value.

In the example shown in FIG. 17, the ECG unit is generated based on the weighting total value obtained by adding the association-degree score and the transition score. In this example, the total value is calculated by assigning weights to the association-degree score between pieces of content information and the transition score between the ECG units, with different degree of weight depending on the service provider 20 (service form), which is to be a providing destination of the ECG unit. For example, when the degree of weight assigned to the association-degree score and the degree of weight assigned to the transition score are 0.2 and 0.8, respectively, the association-degree score and the transition score are summed up with the weighting ratio of 0.2:0.8.

As shown in FIG. 17, the degree of weight is set depending on the entertainment characteristics of a service. Note that the degree of weight may be changed depending on other characteristics apart from the entertainment characteristics, such as a target for which the service is used and popularity of the service. In a service with low entertainment characteristics (service of business, medical field, or the like), the degree of weight on the association-degree score is set higher than that on the transition score, and hence, the importance is placed on the association between attributes. On the other hand, in a service with high entertainment characteristics (service of hobby, art field, or the like), the degree of weight of association-degree score is set lower than that on the transition score, and hence, the importance is placed on providing the user U with new awareness.

In the example shown in FIG. 18, the ECG unit is generated based on the weighting selected by the user U. In this example, the total value obtained by adding the association-degree score between pieces of content information and the transition score between the ECG units is calculated based on the weighting selected by the user U. As shown in FIG. 18, the weighting includes two or more options each having different weighting ratio of the association-degree score to the transition score.

In a pattern 1, the weighting ratio of the association-degree score to the transition score is selected from 0.8:0.2 or 0.2:0.8. In a pattern 2, the weighting ratio is selected from 0.8:0.2, 0.5:0.5, or 0.2:0.8. In a pattern 3, the weighting ratio is selected from 0.85:0.15, 0.65:0.35, 0.5:0.5, 0.35:0.65, or 0.15:0.85. Here, with increase in the weighting ratio of the transition score with respect to the association-degree score, the greater importance is placed on providing the user U with new awareness when generating the ECG unit.

Note that, by developing this example, by totalizing the results of weighting selection performed by the user U, appropriate degree of weight depending on a service form may be determined in the example shown in FIG. 17. In this way, the ECG unit can be generated taking into account the user U's intention that is different for each service form.

[5. Display Example of ECG Unit]

Next, with reference to FIGS. 19 to 21, there will be described display examples of the ECG unit generated by the ECG system 100. In the example shown in FIG. 19, in association with the example shown in FIG. 6, in the central region, pieces of content information A, B, C, D, and E are displayed from top to bottom, and the content information C is being focused on. Further, in the right hand region, pieces of related information C1, C2, C3, C4, C5, . . . of the content information C are displayed from top to bottom.

As the content information and the related information, there are displayed an image, a video, and the like of content. Accordingly, in the central and right hand regions, there is displayed the ECG unit C formed of the content information C and the pieces of related information C1, C2, C3, C4, C5, . . . . Note that the dashed lines drawn in FIG. 19 and FIG. 21 each show the configuration of the ECG unit C, but are not displayed in the display region.

Here, the content information C and related information are each displayed with a level indicator I. The indicators I of the pieces of content information A to E represent levels of transition scores of the ECG units A to E, respectively, and the indicators I of the pieces of related information C1, C2, C3, C4, C5 represent levels of transition scores of the ECG units each having the related information as the content information, respectively.

Here, the transition score may be acquired along with the ECG unit from the ECG system 100, or may be acquired separately from the ECG unit from the ECG system 100. The indicator I is displayed such that the transition score between the ECG units is classified into a predetermined level. Further, in the example shown in FIG. 19, the content information in the central region is placed such that the higher the level of the transition score becomes, the nearer to the middle the content information is placed, and such that the lower the level becomes, the further apart to the top and the bottom the content information is placed. The same applies to the related information in the right hand region. In this way, the display form is controlled in accordance with the transition score between the ECG units, which can provide the user U with new awareness.

Figure 19:
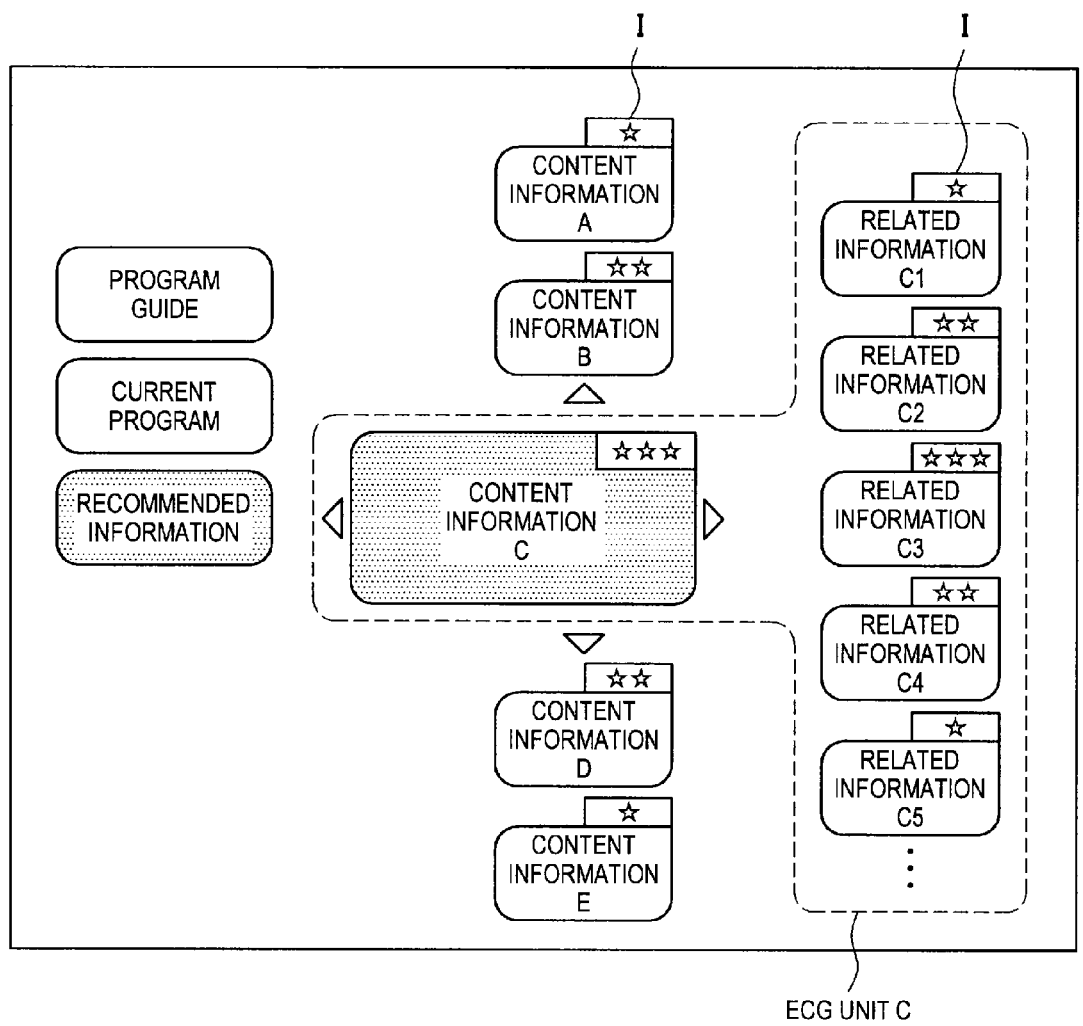
FIG. 19 is a diagram showing a display example (1/3) of the ECG unit based on the transition score.

Note that the display of the ECG unit based on the transition score is not limited to the example shown in FIG. 19. For example, the content information and the related information may be displayed such that the higher the transition score becomes, the larger and clearer they are displayed. Further, in the case where focus is moved in the central region or in the right hand region, the content information or the related information may be displayed such that the higher the transition score becomes, the easier it is being focused on. Further, in the case where the display of the central region or the right hand region is automatically scrolled in the up/down direction, the content information or the related information may be displayed such that the higher the transition score becomes, the longer the display time period becomes or the larger the number of times being displayed becomes. Further, the indicators I of the content information and the related information may each display a numerical value of the transition score instead of the level of the transition score.

Figure 20:
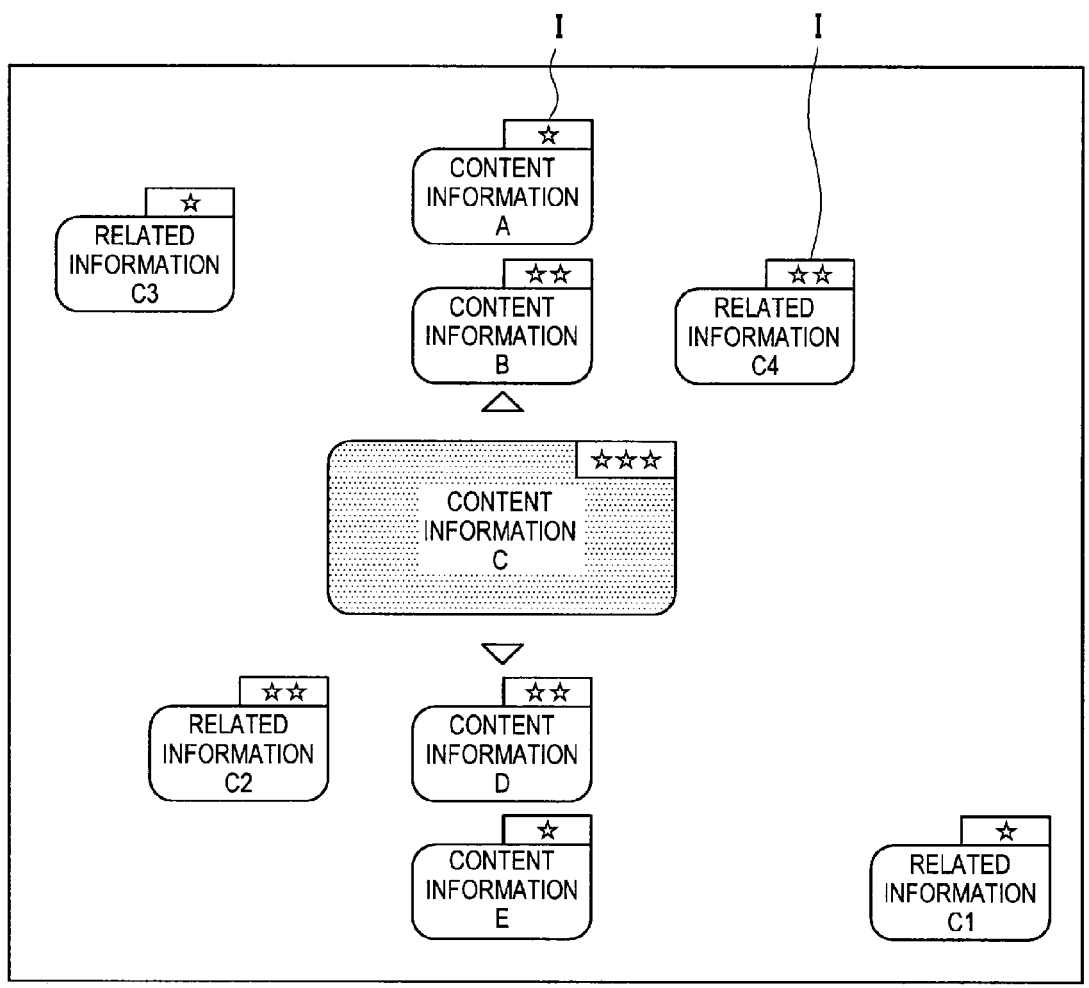
FIG. 20 is a diagram showing the display example (2/3) of the ECG unit based on the transition score.

In the example shown in FIG. 20, in the central region, the pieces of content information A, B, C, D, and E are displayed from top to bottom, and the content information C is being focused on. Further, in the left hand and right hand regions, pieces of related information C1, C2, C3, C4, . . . of the content information C are displayed. Here, the pieces of related information C1 to C4 are placed such that the higher the level of the transition score becomes, the nearer to the central region they are placed, and such that the lower the level becomes, the further apart from the central region they are placed. Here, when the focus is moved in the up/down direction, the display is scrolled in the up/down direction in the central region, and in the left hand and right hand regions, the related information of the content information which is being focused on in the central region is displayed. In this way, the display form is controlled in accordance with the transition score between the ECG units, which can provide the user U with new awareness.

Note that the display of the ECG unit based on the transition score is not limited to the example shown in FIG. 20. For example, the related information may be displayed such that the higher the transition score becomes, the larger and clearer it is displayed. Further, the related information may be displayed such that the higher the level of the transition score becomes, the nearer to the front surface side of the screen it is displayed (i.e., enlarged display), and such that the lower the level becomes, the nearer to the back surface side of the screen it is displayed (i.e., reduced display).

In the example shown in FIG. 21, in association with the example shown in FIG. 19, there are shown a case where the focus in the central region is moved from content information X to the content information C, and a case where the focus in the central region is moved from content information Y to the content information C. In both cases, in the right hand region, the pieces of related information C1, C2, C3, C4, C5, . . . are displayed. However, the indicator I displayed for the related information differs depending on the content information of the link source to the content information C.

The indicators I of the pieces of related information C1, C2, C3, C4, and C5 each represent a level of lowness in the degree of association between the attribute of the content information of the link source to the content information C and the attribute of each related information. Here, the degree of association between the attributes may be determined by the ECG system 100 or by the user terminal 30, based on the attributes of metadata of content information and of each related information.

For example, let us assume that the genres of the content information C, the content information X, and the content information Y are program, anime, and sports, respectively. Then, in the case where the focus is moved from the content information X to the content information C, that is, in the case where the focus is moved from anime to program, the level of the indicator I of related information (for example, related information C3) having low degree of association with anime from among pieces of related information, is set high. On the other hand, in the case where the focus is moved from the content information Y to the content information C, that is, in the case where the focus is moved from sports to program, the level of the indicator I of related information (for example, related information C1) having low degree of association with sports from among pieces of related information, is set high. In this way, the display form is controlled in accordance with the degree of association of attribute between the pieces of content information, which can provide the user U with new awareness.

[6. Summary]

As described above, according to the ECG system of the embodiments of the present disclosure, in order to evaluate the ECG unit which causes the transition to occur between the ECG units of the link source and the link destination having low degree of association therebetween, the transition score between the ECG units is introduced. Then, by generating an ECG unit based on the transition score between the ECG units along with the degree of association (association-degree score) between the pieces of content information, there can be provided the ECG unit as information with high availability, in which it is possible to provide the user U with new awareness through an attribute with low attribute while maintaining the association therebetween through an attribute with high association.

With increase in the number of the usage logs, the transition score increases, and hence, it is difficult to expect a high score unless the availability of the content information itself is high and the content information is frequently viewed. Also, with increase in the transition score, the ECG unit is more likely to be linked to a large number of ECG units and the usage frequency thereof increases. Accordingly, by generating the ECG unit based on the transition score, it becomes possible to persuade a provider of the content information to provide high quality content information, and to enhance the quality of the ECG service itself.

It should be understood by those skilled in the art that various modifications, combinations, sub-combinations and alterations may occur depending on design requirements and other factors insofar as they are within the scope of the appended claims or the equivalents thereof.

For example, in the embodiments described above, although the case has been described in which the ECG engine 120 and the distribution server 150 are separately configured, the functions of the ECG engine 120 and the distribution server 150 may be configured in an integrated manner. Further, in the embodiments described above, although the case has been described in which the functions of the analysis engine 130 and the transition score calculation section 123 are configured in an integrated manner, those functions may be configured separately.

Further, in the embodiments described above, the case has been described in which the ECG unit is formed of two hierarchies of the content information and one or more pieces of related information related to the content information. However, the ECG unit may be formed of three or more hierarchies, by including additional one or more pieces of related information related to the related information.

What is claimed is:

1. An information providing system comprising:
circuitry configured to operate as
a content unit providing section which provides a content unit, the content unit being formed of content information and one or more pieces of related information related to the content information, and being linked to another content unit through the related information;
an association-degree score calculation section which calculates an association-degree score between the pieces of content information based on a degree of association of an attribute between the pieces of content information;
a usage log collection section which collects a history of operation performed for making a transition from one or more content units of link sources to one or more content units of link destinations via the content unit, as a usage log of the content unit;
a transition score calculation section which calculates a transition score between the content units based on a corrected usage log which is obtained by applying a correction coefficient to the usage log, the correction coefficient based on a number of attributes of content information and a degree of association with each other between the content unit of the link source and the content unit of the link destination; and
a content unit generation section which generates a content unit linked to another content unit, based on the association-degree score between the pieces of content information and the transition score between the content units.

2. The information providing system according to claim 1, wherein the correction coefficient is set by a user.

3. An information providing method comprising:
providing a content unit, the content unit being formed of content information and one or more pieces of related information related to the content information, and being linked to another content unit through the related information;
calculating an association-degree score between the pieces of content information based on a degree of association of an attribute between the pieces of content information;
collecting a history of operation performed for making a transition from one or more content units of link sources to one or more content units of link destinations via the content unit, as a usage log of the content unit;
calculating a transition score between the content units based on a corrected usage log which is obtained by applying a correction coefficient to the usage log, the correction coefficient based on a number of attributes of content information and a degree of association with each other between the content unit of the link source and the content unit of the link destination; and
generating a content unit linked to another content unit, based on the association-degree score between the pieces of content information and the transition score between the content units.

4. A non-transitory computer readable medium having stored thereon a program for causing a computer to execute an information providing method, said method comprising:
providing a content unit, the content unit being formed of content information and one or more pieces of related information related to the content information, and being linked to another content unit through the related information, calculating an association-degree score between the pieces of content information based on a degree of association of an attribute between the pieces of content information, collecting a history of operation performed for making a transition from one or more content units of link sources to one or more content units of link destinations via the content unit, as a usage log of the content unit, calculating a transition score between the content units based on a corrected usage log which is obtained by applying a correction coefficient to the usage log, the correction coefficient based on a number of attributes of content information and a degree of association with each other between the content unit of the link source and the content unit of the link destination; and generating a content unit linked to another content unit, based on the association-degree score between the pieces of content information and the transition score between the content units.

* * * * *